(12) United States Patent
Nammi

(10) Patent No.: US 9,414,365 B2
(45) Date of Patent: Aug. 9, 2016

(54) CHANNEL QUALITY REPORTING IN A WIRELESS COMMUNICATION SYSTEM

(71) Applicant: TELEFONAKTIEBOLAGET L M ERICSSON (PUBL), Stockholm (SE)

(72) Inventor: Sairamesh Nammi, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 364 days.

(21) Appl. No.: 14/004,747

(22) PCT Filed: Jul. 25, 2013

(86) PCT No.: PCT/SE2013/050929
§ 371 (c)(1),
(2) Date: Sep. 12, 2013

(87) PCT Pub. No.: WO2014/021768
PCT Pub. Date: Feb. 6, 2014

(65) Prior Publication Data
US 2014/0078982 A1      Mar. 20, 2014

Related U.S. Application Data

(60) Provisional application No. 61/679,238, filed on Aug. 3, 2012.

(51) Int. Cl.
| H04B 7/216 | (2006.01) |
| H04W 72/04 | (2009.01) |
| H04B 7/04 | (2006.01) |
| H04B 7/06 | (2006.01) |

(52) U.S. Cl.
CPC ......... *H04W 72/0413* (2013.01); *H04B 7/0473* (2013.01); *H04B 7/063* (2013.01); *H04B 7/065* (2013.01)

(58) Field of Classification Search
None
See application file for complete search history.

(56) References Cited

U.S. PATENT DOCUMENTS

| 2010/0135230 | A1* | 6/2010 | Baker et al. | 370/329 |
| 2010/0167657 | A1* | 7/2010 | Molnar et al. | 455/67.11 |
| 2010/0322333 | A1* | 12/2010 | Goransson et al. | 375/260 |
| 2011/0249656 | A1* | 10/2011 | Cai et al. | 370/336 |

(Continued)

FOREIGN PATENT DOCUMENTS

WO    2013169191 A2    11/2013

OTHER PUBLICATIONS

International Search Report and Written Opinion issued in corresponding application PCT/SE2013/050929, dated Oct. 31, 2013, 10 pages.

(Continued)

*Primary Examiner* — Steven H Nguyen
(74) *Attorney, Agent, or Firm* — Rothwell, Figg, Ernst & Manbeck, P.C.

(57) ABSTRACT

In one aspect, a method performed by a user equipment, UE, in a wireless telecommunication system is provided. The UE is configured in multiple input multiple output, MIMO, mode with four transmit antennas. The method includes: transmitting a type A channel status report, CSR, to a network node in a radio access network of the wireless telecommunication system, wherein the type A CSR identifies a first rank; and transmitting a type B CSR to the network node, wherein the type B CSR identifies a second rank, characterized in that the second rank is limited to one of 1, 2, and 3.

10 Claims, 21 Drawing Sheets

(56) References Cited

U.S. PATENT DOCUMENTS

| | | | |
|---|---|---|---|
| 2012/0076028 A1* | 3/2012 | Ko et al. | 370/252 |
| 2012/0257568 A1* | 10/2012 | Cai et al. | 370/328 |
| 2013/0115946 A1* | 5/2013 | Lampinen et al. | 455/434 |
| 2013/0195008 A1* | 8/2013 | Pelletier et al. | 370/328 |
| 2014/0355529 A1* | 12/2014 | Zhu et al. | 370/329 |

OTHER PUBLICATIONS

Huawei, et al., "HS-DPCCH design for 4-branch MIMO", 3GPP TSG-RAN WG1 Meeting #69, Prague, Czech Republic, May 21-25, 2012, R1-122684, Agenda item 6.3.4, 6 pages.

Nokia Siemens Networks, "HS-DPCCH design options for 4-branch MIMO", 3GPP TSG-RAN WG1 Meeting #69, Prague, Czech Republic, May 21-25, 2012, R1-122571, Agenda item 6.3.3, 3 pages.

Renesas Mobile Eurpoe Ltd., "Further discussion on feedback design for 4 Branch Downlink MIMO", 3GPP TSG-RAN WG1 Meeting #69, Prague, Czech Republic, May 21-25, 2012, R1-122337, Agenda item 6.3.3, 6 pages.

Ericsson, "UL-Feedback Channel Design for Four Branch MIMO System", 3GPP TSG-RAN WG1 #69, May 21-25, 2012, R1-122612, Agenda Item 6.3.3, 10 pages.

Ericsson, "Feedback Channel Deisgn for Four branch MIMO System," 3GPP TSG-RAN WG1 Meeting #68, Feb. 6-10, 2012, R1-120361, Agenda Item 6.3.4, 7 pages.

Nokia Siemens Networks, "UL feedback design for 4-Tx MIMO", 3GPP TSG-RAN WG1 Meeting #68bis, Mar. 26-30, 2012, R1-121725, Agenda Item 6.3.4, 4 pages.

* cited by examiner

HS-DPCCH structure for Rank-1 Transmissions

HS-DPCCH structure for Rank-2 Transmissions

HS-DPCCH structure for Rank-3 Transmissions

HS-DPCCH structure for Rank-4 Transmissions

HS-DPCCH structure for optimized for Rank-2 Transmissions

CHANNEL QUALITY REPORTING IN A WIRELESS COMMUNICATION SYSTEM

CROSS REFERENCE TO RELATED APPLICATION(S)

This application is a 35 U.S.C. §371 National Phase Entry Application from PCT/SE2013/050929, filed Jul. 25, 2013, which claims priority to U.S. provisional patent application No. 61/679,238, filed on Aug. 3, 2012. The above identified applications are incorporated by reference in their entirety.

TECHNICAL FIELD

Embodiments herein relate generally to a user equipment (UE), a method in the UE, a network node (e.g., a base station) and a method in the network node.

BACKGROUND

In a typical cellular network, also referred to as a wireless communication system, UEs communicate via a radio access network (RAN) to one or more core networks (CNs).

A UE is a device that may access services offered by an operator's core network and services outside operator's network to which the operator's RAN and CN provide access. The UE may be any device, mobile or stationary, enabled to communicate over a radio channel in a communications network, for instance but not limited to e.g. mobile phone, smart phone, sensors, meters, vehicles, household appliances, medical appliances, media players, cameras, or any type of consumer electronic, for instance but not limited to television, radio, lighting arrangements, tablet computer, laptop, or PC. The UE may be portable, pocket-storable, hand-held, computer-comprised, or vehicle-mounted mobile devices, enabled to communicate voice and/or data, via the radio access network, with another entity.

The UE is enabled to communicate wirelessly in the network. The communication may be performed e.g. between two UEs, between a UE and a regular telephone and/or between the UE and a server via a RAN and possibly one or more core networks, comprised within the cellular network.

The RAN covers a geographical area which is divided into cell areas, with each cell area being served by a network node in the form of a base station, e.g. a Radio Base Station (RBS), which in some radio access networks is also called evolved NodeB (eNB), NodeB, B node or base station. A cell is a geographical area where radio coverage is provided by the base station at a base station site. Each cell is identified by an identity within the local radio area, which is broadcast in the cell. The base stations communicate over the air interface operating on radio frequencies with the UE within range of the base stations.

Standardised by the third Generation Partnership Project (3GPP), High Speed Downlink Packet Access (HSPA) supports the provision of voice services in combination with mobile broadband data services. HSPA comprises High Speed Downlink Packet Access (HSDPA), High Speed Uplink Packet Access (HSUPA) and HSPA+. HSDPA allows networks based on the Universal Mobile Telecommunications System (UMTS) to have higher data transfer speeds and capacity. In HSDPA, a new transport layer channel, High Speed Downlink Shared Channel (HS-DSCH), has been added to the UMTS release 5 and further specification. It is implemented by introducing three new physical layer channels: High-Speed Shared Control Channel (HS-SCCH), Uplink High-Speed Dedicated Physical Control Channel (HS-DPCCH) and High-Speed Physical Downlink Shared Channel (HS-PDSCH). The HS-SCCH informs the UE that data will be sent on the HS-DSCH, 2 slots ahead. The HS-DPCCH carries acknowledgment information and a current Channel Quality Indicator (CQI) value of the UE. This CQI value is then used by the base station to calculate how much data to send to the UE on the next transmission. The HS-PDSCH is the channel mapped to the above HS-DSCH transport channel that carries actual user data. HSPA may recover fast from errors by using Hybrid Automatic Repeat reQuest (HARQ). HARQ is a technique that enables faster recovery from errors in communications networks by storing corrupted packets in the receiving device rather than discarding them. Even if retransmitted packets have errors, a good packet may be derived from the combination of bad ones.

Multiple Input Multiple Output (MIMO) refers to any communications system with multiple antennas at the transmitter and/or the receiver, and it is used to improve communication performance. The terms input and output refer to the radio channel carrying the signal, not to the devices having antennas. At the transmitter (Tx), multiple antennas may be used to mitigate the effects of fading via transmit diversity and to increase throughput via spatial division multiple access. At the receiver (Rx), multiple antennas may be used for receiver combining which provides diversity and combining gains. If multiple antennas are available at both the transmitter and receiver, then different data streams may be transmitted from each antenna with each data stream carrying different information but using the same frequency resources. For example, using two transmit antennas, one may transmit two separate data streams. At the receiver, multiple antennas are required to demodulate the data streams based on their spatial characteristics. In general, the minimum number of receiver antennas required is equal to the number of separate data streams. 4×4 MIMO, also referred to as four branch MIMO, may support up to four data streams. In general, MIMO may be n×n MIMO, where n is the number of antennas and is positive integer. For example 2×2 MIMO, 8×8 MIMO, 16×16 MIMO etc.

Several new features are added for the long term High Speed Packet Access (HSPA) evolution in order to meet the requirements set by the International Mobile Telecommunications Advanced (IMT-A). The main objective of these new features is to increase the average spectral efficiency. One possible technique for improving downlink spectral efficiency would be to introduce support for four branch MIMO, i.e. utilize up to four transmit and receive antennas to enhance the spatial multiplexing gains and to offer improved beam forming capabilities. Four branch MIMO provides up to 84 Mbps per 5 MHz carrier for high Signal to Noise Ratio (SNR) UEs and improves the coverage for low SNR UEs.

Channel feedback information enables a scheduler to decide which UE should be served in parallel. The UE is configured to send three types of channel feedback information: Channel Quality Indicator (CQI), Rank Indicator (RI) (which indicates the number of transport blocks preferred) and Pre-coding Matric Indicator (PMI), which is also known as Precoding Control Indicator (PCI). CQI is an important part of channel information feedback. The CQI provides the base station with information about link adaptation parameters which the UE supports at the time. The CQI is utilized to determine the coding rate and modulation alphabet, as well as the number of spatially multiplexed data streams. RI is the UE recommendation for the number of layers or transport blocks, i.e. streams to be used in spatial multiplexing. RI is only reported when the UE operates in MIMO mode with spatial multiplexing. The RI may have the values 1 or 2 in a 2×2

MIMO configuration and it may have the values from 1 and up to 4 in a 4×4 MIMO configuration. The RI is associated with a CQI report. This means that the CQI is calculated assuming a particular RI value. The RI typically varies more slowly than the CQI. PMI provides information about a preferred pre-coding matrix in a codebook based pre-coding. PMI is only reported when the UE operates in MIMO. The number of pre-coding matrices in the codebook is dependent on the number of antenna ports on the base station. For example, four antenna ports enables up to 64 matrices dependent on the RI and the UE capability. PCI indicates a specific pre-coding vector that is applied to the transmit signal at the base station.

Introduction of four branch MIMO will require a new feedback channel structure to send the CQI/PCI information to the base station. To reduce the signalling overhead at downlink and uplink, it was recommended to use two code words for four branch MIMO. For designing uplink signalling channel, i.e. HS-DPCCH, it was agreed to use a similar structure as that of 2 Antenna MIMO, described in 3GPP Release-7 (see 3GPP TS 25.214). When reporting CQI, RI and PCI, this channel state information (CSI) may be reported in two reporting intervals. This structure is attractive in terms that it requires minimal standards change. The performance with this structure is very close to that of ideal reporting. In general, the base station needs to wait for two reporting intervals to schedule the UE for data transmission. If the reporting period is configured to a high value, say for example 8 msec, the base station needs to wait 16 msec to schedule the UE. For a high speed UE, this introduces delay and the performance degradation is very severe.

An overview of Channel Quality Reporting and Node B Procedures for Two Branch (2×2) MIMO (Release 7 MIMO) will now be described. FIG. 1 shows the messages exchanged between base station and the UE during a typical data call set up.

The method comprises the following steps, which steps may be performed in any suitable order:

Step 101: The Common Pilot Indicator Channel (CPICH) is a downlink channel broadcast by the base station with constant power and of a known bit sequence.

Step 102: From the CPICH in step 101, the UE estimates the channel conditions and computes the CQI and the PCI, which is the precoding information bits selected in the subset of the codebook corresponding to the rank information. For two antennas, the CQI is computed as: $CQI=15 \times CQI_1 + CQI_2 + 31$, when 2 transport blocks are preferred by the UE; and is computed as: $CQI=CQI_s$ when 1 transport block is preferred by the UE, where the CQI is the channel quality per individual layer, $CQI_s$ is the CQI value in the case of Rank=1 (i.e., one transport block is preferred), $CQI_1$ and $CQI_2$ are the individual CQI values for each stream in the case of Rank=2 (i.e., two transports blocks are preferred). It can be observed that if the computed CQI value is less than 31, the rank information is 1 (i.e., one transport blocks is preferred), otherwise the rank information is 2 (i.e., two transports blocks are preferred).

Step 103: The information computed in step 102, i.e. the CQI and PCI, along with a HARQ ACK/NAK is reported (i.e., transmitted) to the base station using the HS-DPCCH. The periodicity of HS-DPPCH is one subframe (e.g. 2 msec). The structure of the HS-DPCCH is shown in FIG. 2a and FIG. 2b. In FIG. 2a, an example of how the PCI and the CQI are located in the structure is shown. The HS-DPCCH sub-frame structure comprises one slot for HARQ-ACK transmissions and two slots for CQI/PCI transmissions. Even though the text or the drawings refer to a HARQ ACK, it is appreciated that this may also be a HARQ NACK.

The HS-DPCCH sub-frame structure in FIG. 2a for the TTI=2 ms comprises a HARQ ACK or NACK which notifies the base station that the UE has received correct downlink data or not. The field defines like this: 1-NACK, 0-ACK. The CQI reflects the PCI based on CPICH strength. Each sub-frame comprises a HARQ ACK, two CQI-fields and one PCI field. In other words, every sub-frame comprises the same fields.

The HS-DPCCH in 3GPP Rel-5 to Rel-9 is based on a 1×SF256 solution (see TS 25.212). The structure of the HS-DPCCH is shown in FIG. 2b. The HS-DPCCH sub-frame structure consists of 1 slot for HARQ-ACK transmissions and 2 slots for CQI/PCI transmissions. This structure should also be used for 4-branch MIMO.

HARQ Details: For 3GPP Rel-7 MIMO (3GPP TS 25.214) the HARQ-ACK codebook comprises 6 codewords plus PRE/POST.

CQI/PCI Details: In 3GPP Rel-7 (3GPP TS 25.214) there are 5 or 2×4 bits allocated for describing the CQI depending on the CQI type. There are 30 or 15 CQI values per stream for rank1 and rank2, respectively, and RI (i.e., rank) is implicitly signalled via the CQI. Furthermore CQIs for each stream are signalled independent of each other. In addition to CQI bits there are 2 bits allocated for signalling the preferred pre-coding information. The 7 (or 10) information bits are then encoded into 20 channel bits that are transmitted during the second and third slot.

Step 104: Once the base station receives the CQI, PCI and HARQ ACK, it allocates the required channelization codes, modulation and coding, precoding channel index to the UE after scheduling.

Step 105: Information about the required channelization codes, modulation and coding, precoding channel index from step 104 is transmitted to the UE using the HS-SCCH.

Step 106: The UE detects the HS-SCCH.

Step 107: Once the UE has detected the HS-SCCH, the downlink transmission starts through data traffic channel using the HS-PDSCH.

In general, HS-DPCCH design depends on many factors like number of codewords supported, number of HARQ processes, precoding codebook etc. Four branch MIMO should support two codeword and two HARQ processes.

The current HSDPA system (3GPP Release 7-10) supports 1 or 2 transmit antennas at the base station. For these systems, from channel sounding, the UE measures the channel and provides in one subframe a channel status report (CSR) that contains channel state information (CSI) (e.g., a CQI). A sub frame may be defined as for example one Transmission Time Interval (TTI) which may be e.g. 1 ms or 2 ms. Typically, a CSR consists of the CQI, which indicates the RI, and the PCI. The UE sends this report periodically for every subframe, i.e. for every TTI to the base station. Once the base station receives this report it grants the Modulation and Coding Scheme (MCS), number of codes, rank and the PCI to each specific UE based on the scheduler metric. Based on this information, the base station may optimize the downlink throughput for each TTI.

SUMMARY

Introduction of 4-branch MIMO will require a new feedback channel structure to send the channel status report (e.g., CQI/PCI information) to the base station. To reduce the signalling overhead at downlink and uplink, two codewords should be used for four branch MIMO. For designing uplink signalling channel (H-DPCCH), a similar structure that of 2 Antenna MIMO (3GPP Release-7) should be used. This structure for reporting channel state information is attractive in terms that it requires minimal standards change. However, this structure is not optimized for lower rank transmissions as for rank 1 and 2, the CQI reported in $2^{nd}$ reporting interval is redundant. Additionally, a scheduling problem can arise due to the fact that the RI reported in the CSR is dependent on the UE's determination of the channel conditions. Thus, it is possible that when the channel conditions are good, the UE may recommend to the base station to use 4 layers (or "ranks") (i.e., the number of transport blocks preferred by the UE is 4). The base station, however, may not have the resources to allocate the layers suggested by the UE. In this scenario, the base station may not schedule the UE. Accordingly, this disclosure provides an improved scheme for reporting channel state information.

An object of embodiments of this disclosure is to overcome at least one of the above disadvantages and to provide improved scheduling of UE in a communications system. As discussed above, in the current scheme of channel status reporting, there are no constraints on the UE with respect to the number of layers (ranks) the UE may choose to recommend to the base station (e.g., in four branch MIMO the UE is free to choose an RI value of 1, 2, 3 or 4). Since this may lead to sub-optimal scheduling in the base station, this disclosure proposes at least two types of CSR: e.g., type A and type B. The UE can be configured to sometimes provide a type A CSR and sometimes provide a type B CSR. For instance, the UE can be configured to respond to messages from the base station that indicate how often the UE should send type A CSRs and how often type B CSRs should be reported. These messages may be referred to as "orders." As a particular example, the base station may send an order to the UE instructing the UE to send one type B report for every ten (10) type A reports that the UE sends.

Advantageously, a type B report indicates a rank selected by the UE, where the rank that is selected by the UE is: (a) based on a rank identified in an order from the base station, wherein the identified rank may set an upper-limit on the rank the UE may select or (b) selected from a sub-set of the ranks that are available to be selected (e.g., the ranks that are available may be 1, 2, 3 and 4, whereas the sub-set includes only rank 1, 2 and/or 3). In this way, when sending a type B report the UE is constrained with respect to the number of layers (i.e., transport blocks) the UE may choose to recommend to the base station. In other words, in some embodiments, when the UE experiences good channel conditions, the type B report will include a CQI based on a low rank (e.g., 1 or 2), whereas the type A report may include a CQI based on a high rank (e.g., 4)—in this way the base station will have the option of using the CQI from the type B report or the CQI from the type A report to transmit data to the UE, and, thus, there is a greater chance that the UE can get scheduled by the base station.

Accordingly, in one aspect, a method performed by a user equipment, UE, in a wireless telecommunication system is provided. The UE is configured in multiple input multiple output, MIMO, mode with four transmit antennas. The method includes: transmitting a type A channel status report, CSR, to a network node in a radio access network of the wireless telecommunication system, wherein the type A CSR identifies a first rank; and transmitting a type B CSR to the network node, wherein the type B CSR identifies a second rank, characterized in that the second rank is limited to one of 1, 2, and 3. In some embodiments, the second rank is limited to one of 1 and 2. In some embodiments, the second rank is limited to 1. In some embodiments, the method further includes the UE, prior to transmitting the type A CSR, selecting the first rank using a first scheme, and, prior to transmitting the type B CSR, selecting the second rank using a second scheme that is different than the first scheme. In some embodiments, selecting the second rank using the second scheme consists of selecting a specific predefined rank, and selecting the first rank using the first scheme comprises of selecting a rank from a set of four ranks based on the condition of a channel between the UE and the network node.

In some embodiments, the method further comprises the UE, prior to transmitting the type A CSR, performing the following steps: i) based on a received CPICH, estimating a channel condition of a channel between the UE and the network node; ii) based on the estimated channel condition, selecting a first rank from a set of four ranks; iii) calculating a first channel quality indicator, CQI, value based on, at least in part, the selected first rank; and iv) including the first CQI value in the type A CSR; and prior to transmitting the type B CSR, performing the following steps: i) calculating a second CQI value based on, at least in part, a second rank, wherein the second rank was not selected based on a condition of the channel; and ii) including the second CQI value in the type B CSR. In some embodiments, the second rank indicates that the number of preferred transport blocks is 1.

In some embodiments, the method further comprises determining whether a type B CSR should be transmitted, wherein the determination comprises determining whether a predetermined number of type A CSRs have been transmitted since the last type B CSR was transmitted.

In some embodiments, the method further comprises receiving from the network node a CSR order specifying a number of type A CSRs that should be transmitted for each X number of type B CSRs that are transmitted, wherein X is an integer greater than zero.

In another aspect, a UE is provided. The UE is configured in multiple input multiple output, MIMO, mode with four transmit antennas. The UE is further configured to: transmit a type A channel status report, CSR, to a network node in a radio access network of the wireless telecommunication system, wherein the type A CSR identifies a first rank; and transmit a type B CSR to the network node, wherein the type B CSR identifies a second rank, characterized in that the second rank is limited to one of 1, 2, and 3.

In another aspect, a computer program product is provided. The computer program product includes a computer readable medium storing computer instructions which, when executed by a processor of a UE that is configured in multiple input multiple output, MIMO, mode with four transmit antennas, configures the UE to: transmit a type A channel status report, CSR, to a network node in a radio access network of the wireless telecommunication system, wherein the type A CSR identifies a first rank; and transmit a type B CSR to the network node, wherein the type B CSR identifies a second rank, characterized in that the second rank is limited to one of 1, 2, and 3.

The above and other aspects and embodiments are further described below.

The drawings are not necessarily to scale and the dimensions of certain features may have been exaggerated for the sake of clarity. Emphasis is instead placed upon illustrating the principle of the embodiments herein.

DETAILED DESCRIPTION

Figure 3:
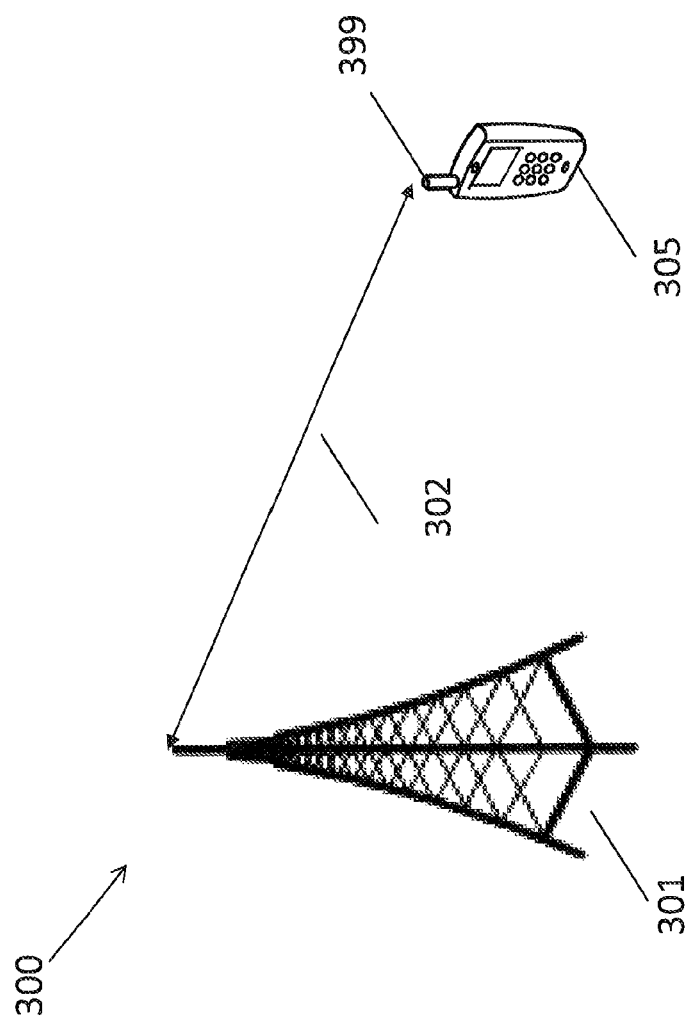
FIG. 3 is a schematic block diagram illustrating embodiments of a communications system.

FIG. 3 depicts a communications network 300 in which embodiments herein may be implemented. The communications network 300 may in some embodiments apply to one or more radio access technologies such as for example Long Term Evolution (LTE), LTE Advanced, Wideband Code Division Multiple Access (WCDMA), HSPA, Global System for Mobile Communications (GSM), or any other Third Generation Partnership Project (3GPP) radio access technology or other radio access technologies such as Wireless Local Area Network (WLAN). In one embodiment, the communications network 300 is a multi-transmit antenna wireless telecommunication system, such as e.g. a four-way transmit antenna wireless communications network, an eight-way transmit antenna wireless communications network, a sixteen-way transmit antenna wireless communications network etc.

The wireless communications network 300 comprises radio access network comprising a network node 301, which in this example is a base station 301 serving a cell with a UE 305 being present in the cell. The UE 305 has multiple antennas 399 (e.g., four transmit antennas). The network node 301 may be a base station such as a NodeB, an eNodeB, a pico node, a WLAN wireless access point/router or any other network unit capable to communicate over a radio carrier 302. The UE 305 may be any device, mobile or stationary, enabled to communicate over the radio channel 302 in the communications network 300, for instance but not limited to e.g. mobile phone, smart phone, sensors, meters, vehicles, household appliances, medical appliances, media players, cameras, or any type of consumer electronic, for instance but not limited to television, radio, lighting arrangements, tablet computer, laptop, or PC.

Figure 4:
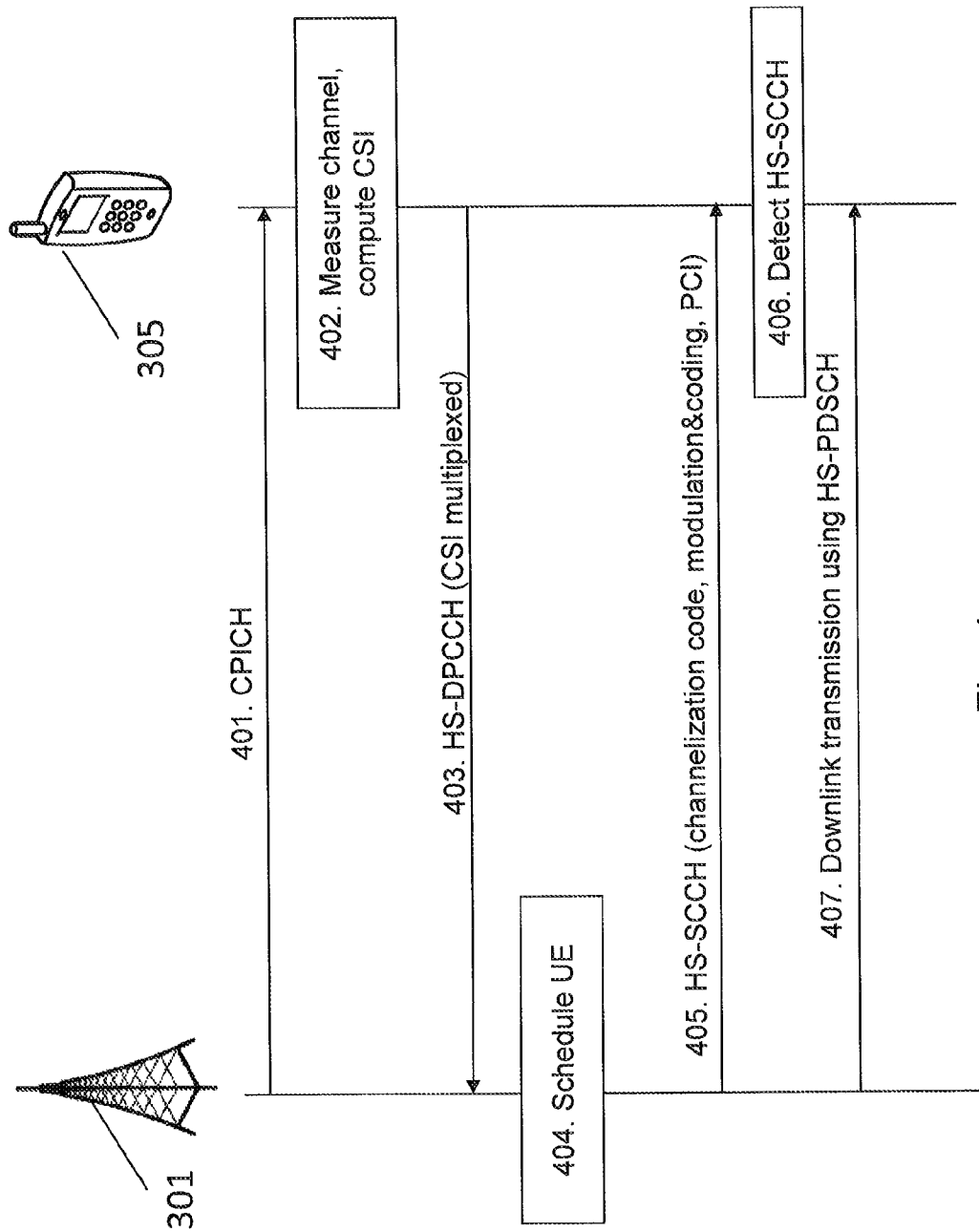
FIG. 4 is a signalling diagram illustrating embodiments of a method.

Even though the following text uses four branch MIMO as an example, it is also valid for any other type of MIMO, such as e.g. 8×8 and 16×16. The method for enabling a base station 301 to schedule the UE 305 in a wireless communication system 300 according to some embodiments will now be described with reference to the combined signalling diagram and flowchart depicted in FIG. 4. The method comprises the following steps, which steps may as well be carried out in another suitable order than described below.

Step 401

The Common Pilot Indicator Channel (CPICH) is a downlink channel broadcast by the base station 301 with constant power and of a known bit sequence.

Step 402

From the CPICH in step 401, the UE 305 estimates or measures the channel 302 and computes the channel state information (CSI) which may be comprise the CQI, the RI and the PCI. For two antennas, the CQI is computed as follows: $CQI=15 \times CQI_1+CQI_2+31$, when 2 transport blocks are preferred by the UE; and is computed as: $CQI=CQI_s$ when 1 transport block is preferred by the UE, where the CQI is the channel quality per individual layer, $CQI_s$ is the CQI value in the case of Rank=1 (i.e., one transport block is preferred), $CQI_1$ and $CQI_2$ are the individual CQI values for each stream in the case of Rank=2 (i.e., two transports blocks are preferred). It can be observed that if the computed CQI value is less than 31, the rank information is 1 (i.e., one transport blocks is preferred), otherwise the rank information is 2 (i.e., two transports blocks are preferred). The UE 305 may store the CSI in a memory 1305.

Step 403

For the 4 branch MIMO with two HARQ process, the UE 305 informs the base station 301 periodically about the following parameters through the feedback channel (HS-DPCCH):

HARQ ACK information—Same structure that of 3GPP Release-7.

CQI per codeword—Since 2 codewords are defined in the standard, two codewords are needed (5 bits each). For two HARQ processes, two CQI are needed, the same as that of Release 7. The CQI tables of Release 7 may be reused. For two HARQ processes, two CQI same as that of Release 7 is necessary. Hence total 8 bits for the two CQI. It is possible to reuse the CQI tables of Release 7.

RI—Indicates the number of layers the UE 305 is preferring (2 bits). Since up to 4 streams are possible, it is recommended to use 2 dedicated bits for indicating rank information if RI is conveyed explicitly.

PCI—Precoding Control Indicator in the RI (4 bits). Since, it has been decided to use LTE-Release 8 precoder. Hence 4 bits is used to indicate the precoding weights per each rank.

I. Possible Structures for Reporting CSI

Figure 5:
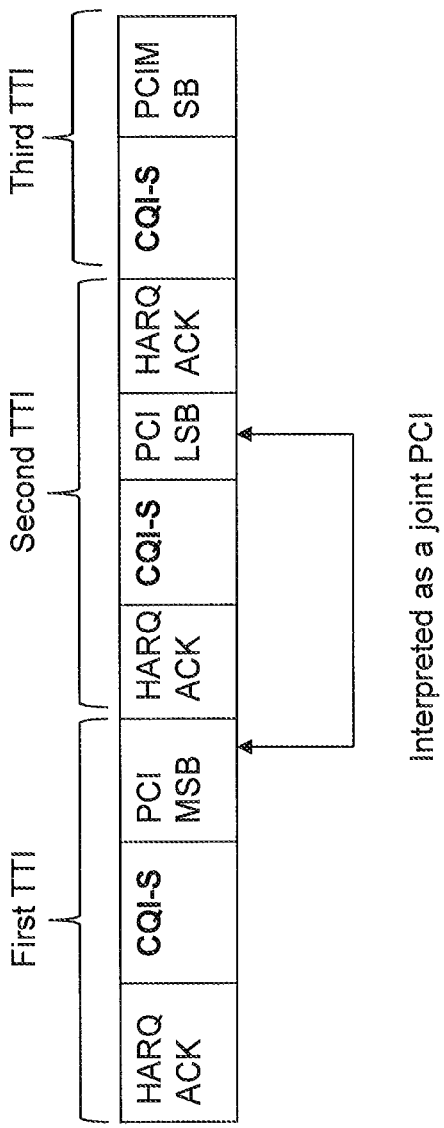
FIG. 5 is a schematic block diagrams illustrating embodiments of a HS-DPCCH structure for a rank 1 transmission.

FIG. 5 illustrates an example of the HS-DPCCH structure for a rank-1 transmission with time multiplexed PCI. Note that the rank information is conveyed implicitly. The first TTI, which also may be referred to as a first reporting interval or a first CSI report, comprises the HARQ ACK, the CQI-S and the PCI MBS. The PCI-MSB indicates the most significant bits of the PCI. The second TTI, also referred to as a second reporting interval or second CSI report, comprises the HARQ ACK, CQI-S and the PCI LSB. The PCI-LSB indicates the lease significant bits of PCI. Thus, the PCI is time multiplexed over two TTIs, but still interpreted as a joint PCI. Note that CQI-S refers to the single stream and corresponds to the CQI value less than 31. The third TTI, also referred to as a third reporting interval or third CSI report, comprises the HRQ ACK, the CQI-S and the PCI MSB. Also note that PCI is reported in two reporting intervals.

Figure 6:
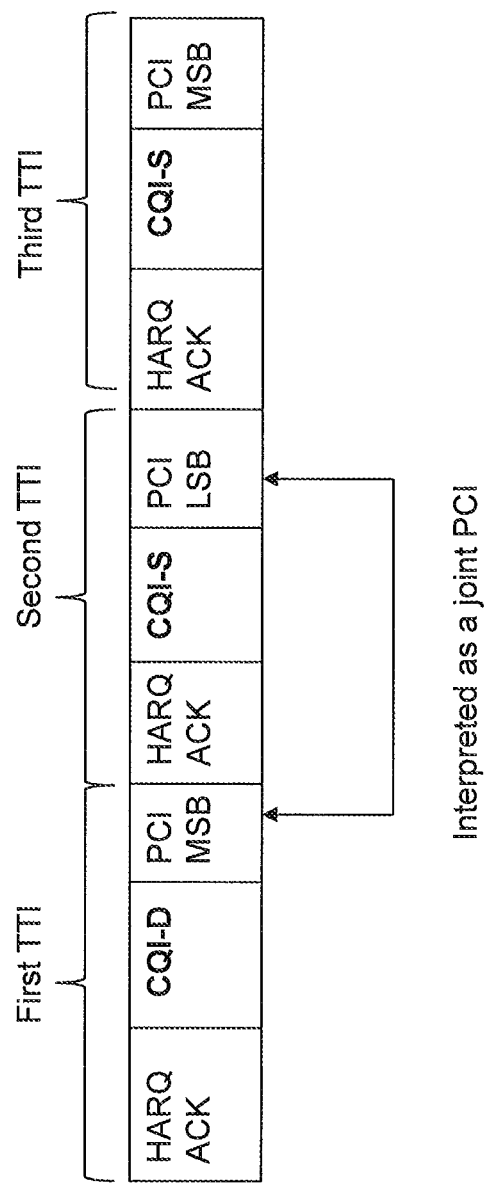
FIG. 6 is a schematic block diagrams illustrating embodiments of a HS-DPCCH structure for a rank 2 transmission.

FIG. 6 illustrates an example of the HS-DPCCH structure for a rank-2 transmission. The first TTI comprises the HARQ ACK, the CQI-D and the PCI MBS. The PCI-MSB indicates the most significant bits of the PCI. The CQI-D indicates the dual stream, and corresponds to the CQI value greater than 31. The second TTI comprises the HARQ ACK, CQI-S and the PCI LSB. The PCI-LSB indicates the lease significant bits of PCI. Thus, the PCI is time multiplexed over two TTIs, but still interpreted as a joint PCI. Note that CQI-S refers to the single stream and corresponds to the CQI value less than 31. The third TTI, also referred to as a third reporting interval or third CSI report, comprises the HRQ ACK, the CQI-S and the PCI MSB.

Figure 7:
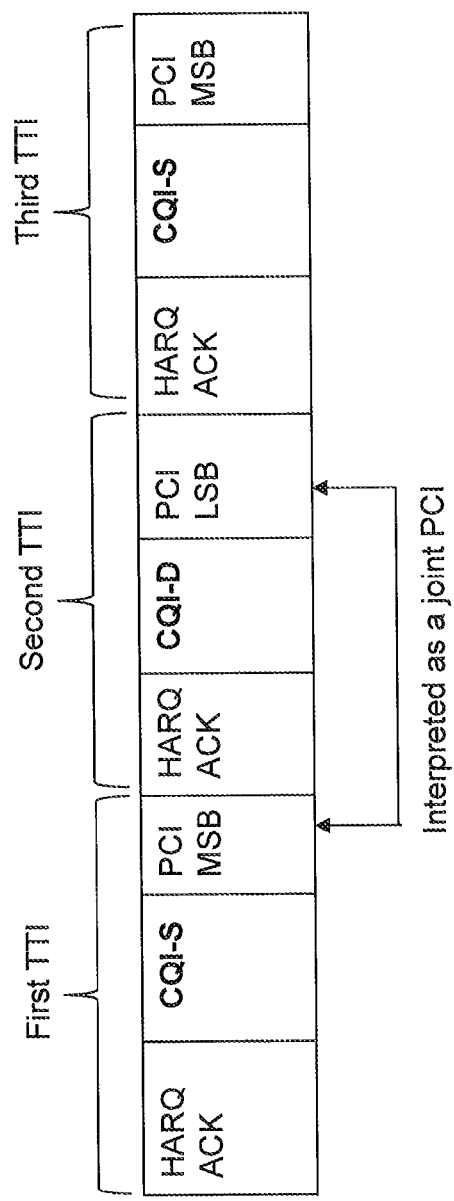
FIG. 7 is a schematic block diagrams illustrating embodiments of a HS-DPCCH structure for a rank 3 transmission.

FIG. 7 illustrates an example of the HS-DPCCH structure for a rank-3 transmission. The first TTI comprises the HARQ ACK, the CQI-S and the PCI MBS. The PCI-MSB indicates the most significant bits of the PCI. The CQI-S indicates the single stream, and corresponds to the CQI value less than 31. The second TTI comprises the HARQ ACK, CQI-D and the PCI LSB. The PCI-LSB indicates the lease significant bits of PCI. Thus, the PCI is time multiplexed over two TTIs, but still interpreted as a joint PCI. Note that CQI-D refers to the dual stream and corresponds to the CQI value greater than 31. The third TTI, also referred to as a third reporting interval or third CSI report, comprises the HRQ ACK, the CQI-S and the PCI MSB.

Figure 8:
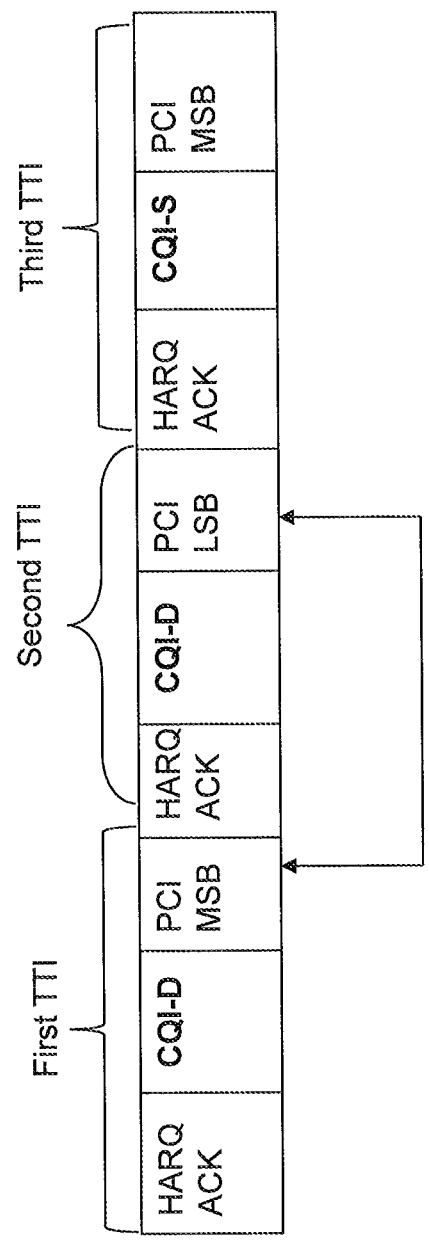
FIG. 8 is a schematic block diagrams illustrating embodiments of a HS-DPCCH structure for a rank 4 transmission.

FIG. 8 illustrates an example of the HS-DPCCH structure for a rank-4 transmission. The first TTI comprises the HARQ ACK, the CQI-D and the PCI MBS. The PCI-MSB indicates the most significant bits of the PCI. The CQI-D indicates the single stream, and corresponds to the CQI value greater than 31. The second TTI comprises the HARQ ACK, CQI-D and the PCI LSB. The PCI-LSB indicates the lease significant bits of PCI. Thus, the PCI is time multiplexed over two TTIs, but still interpreted as a joint PCI. The third TTI, also referred to as a third reporting interval or third CSI report, comprises the HRQ ACK, the CQI-S and the PCI MSB. Note that CQI-S refers to the single stream and corresponds to the CQI value less than 31.

Figure 9:
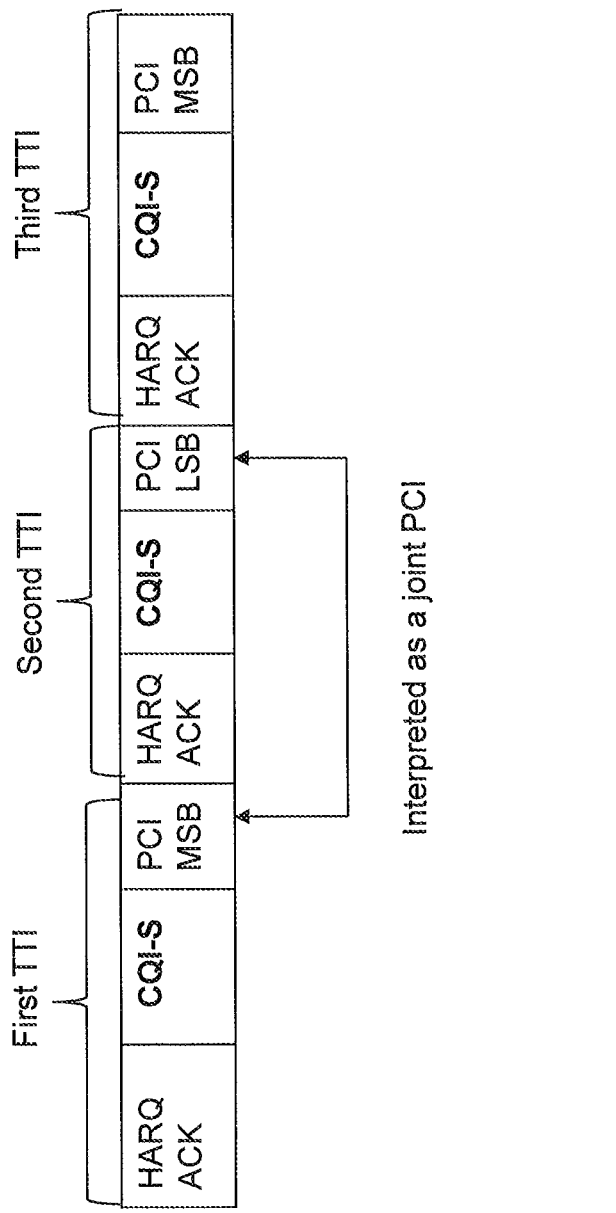
FIG. 9 is a schematic block diagram illustrating embodiments of a HS-DPCCH structure optimized for Rank-2 Transmissions.

FIG. 9 depicts an embodiment for a HS-DPCCH structure optimized for Rank-2 transmissions. Note that the main motivation of this structure is instead of sending CQI-S in the second reporting interval; individual CSI-S is used in the two reporting intervals. i.e. in the first reporting interval, i.e. the first TTI, the UE sends the CQI corresponds to the first layer/codeword, and in the second reporting interval, i.e. the second TTI, the UE sends the CQI corresponds to the second layer/codeword. The advantage of this is that 5 bits are used to represent CQI for rank-2 transmissions, hence more granularity. Note that for design option-1 we use 4 bits for CQI granularity. The third TTI is in FIG. 9 exemplified to comprise the HARQ ACK, CQI-S and PCI MBS. However the third TTI may comprise any other suitable parameters.

Figure 1:
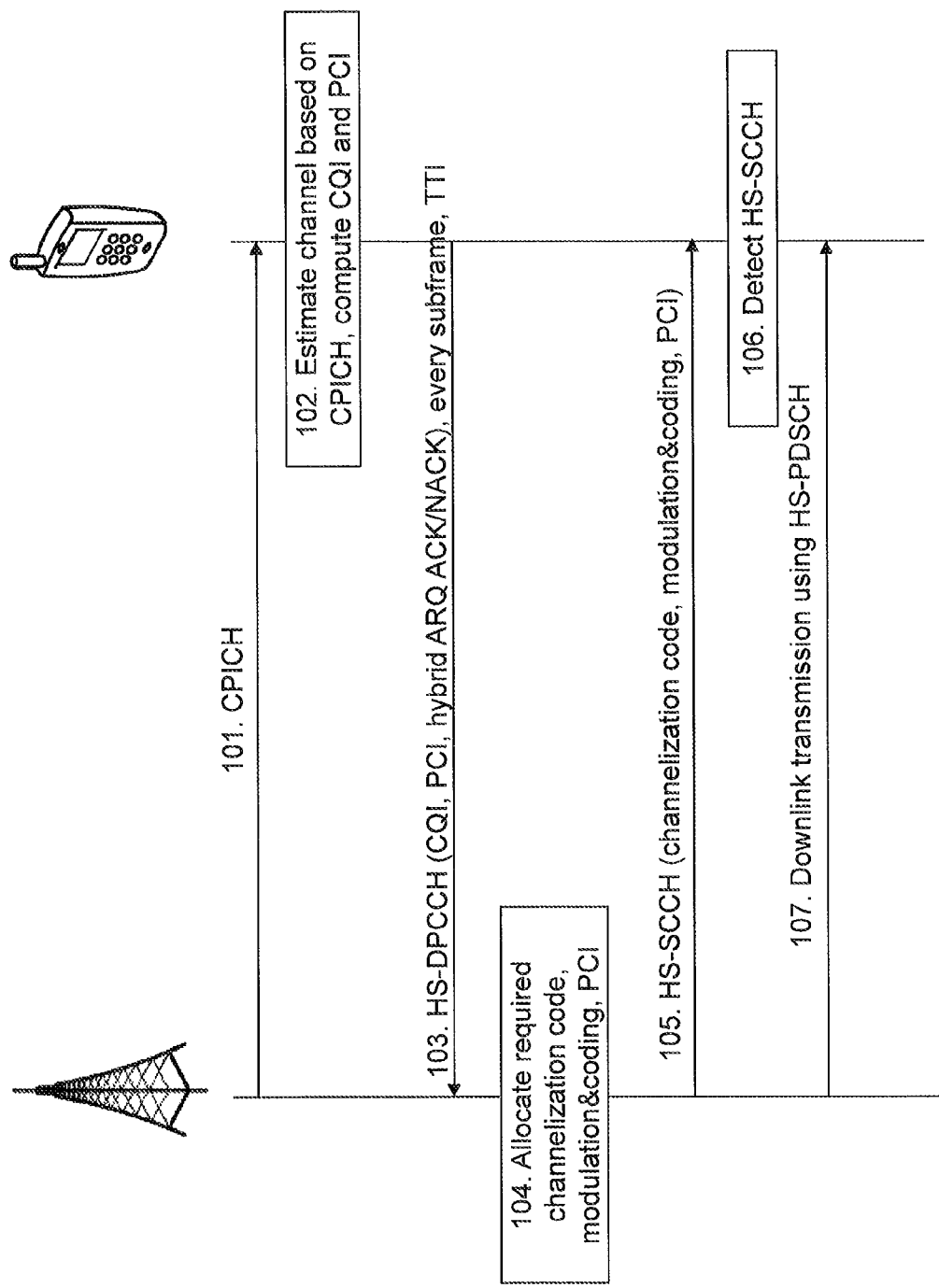
FIG. 1 is a signalling diagram illustrating embodiments of a method.
Figure 2A:
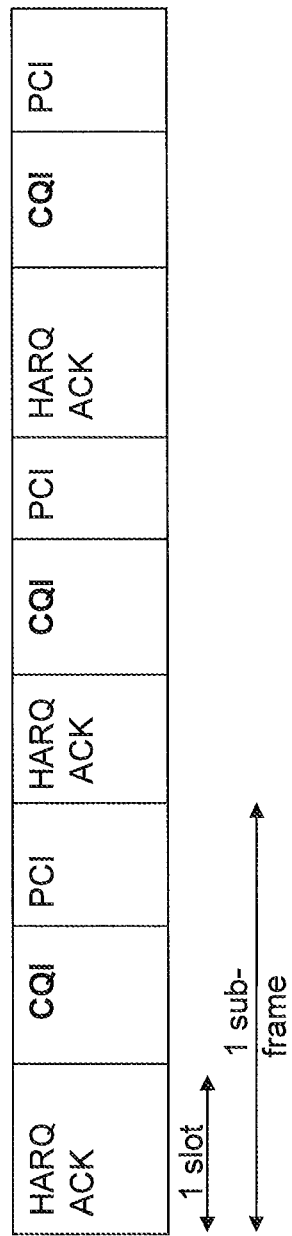
FIG. 2a-b are schematic block diagrams illustrating embodiments of a HS-DPCCH structure.
Figure 2B:
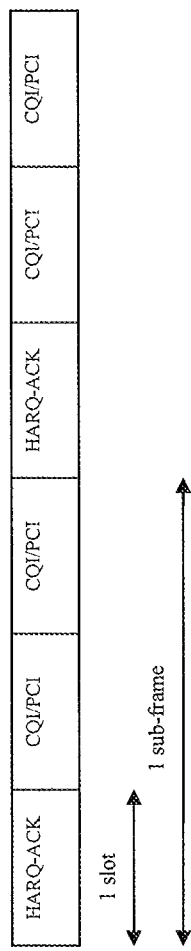
Figure 10:
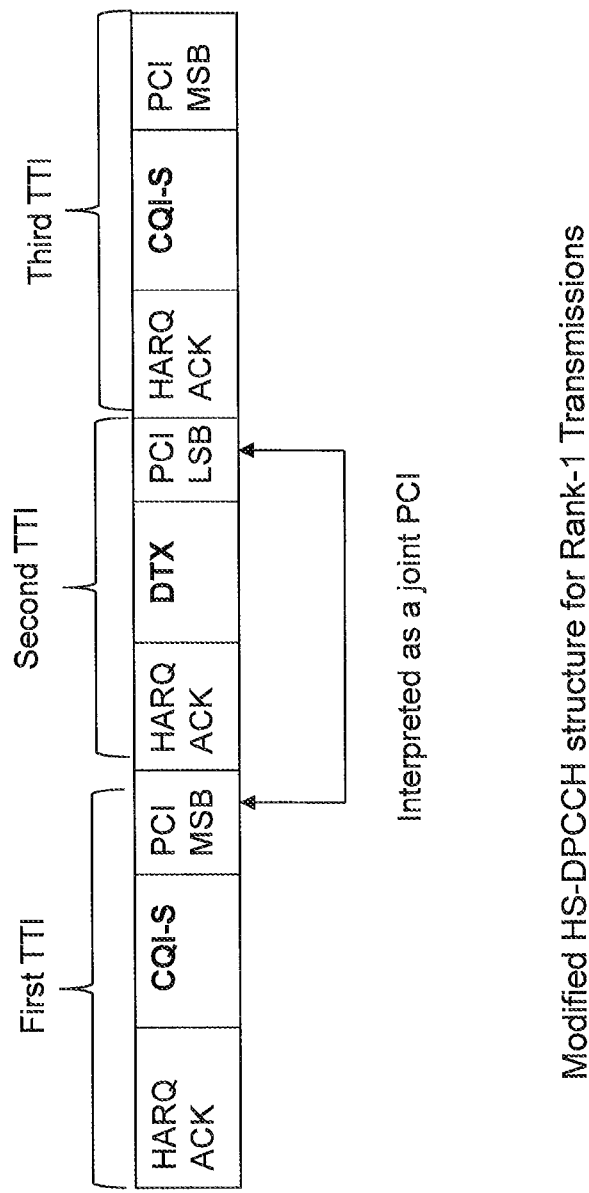
FIG. 10 is a schematic block diagram illustrating embodiments of a modified HS-DPCCH structure for Rank-1 Transmissions.

Observe that HS-DPCCH structure optimized for Rank-2 transmissions is equivalent to that of Ranks-1 transmissions as in FIG. 1. Hence to differentiate Optimized structure for Ranks-2 transmissions the Discontinuous Transmission, DTX, codeword/dummy codeword is sent in the second reporting intervals as in FIG. 10. Observe that sending dummy does not impact the performance for Rank-1 transmissions as the information is anyhow redundant. Discontinuous transmission (DTX) is a method of momentarily powering-down, or muting, a UE when there is no input to the UE. This optimizes the overall efficiency of a wireless communications system. In FIG. 10, the first TTI comprises a HARQ ACK, a CQI-S and a PCI MBS. The second TTI comprises a HARQ ACK, a DTX and a PCI LSB. The third TTI comprises a HARQ ACK, a CQI-S and a PCI MBS. The third TTI may comprise any other parameters than the ones used as an example in FIG. 10.

Returning to FIG. 4:

Step 404

Once the base station 301 has received the CSI information in the first TTI, the base station 301 starts to schedule the UE 305, i.e. it schedules the transport blocks, modulation and coding scheme, precoding control index for the UE 305. As mentioned above, ideally, the base station 301 needs three TTI to schedule the UE 305 as only after 3 TTI, it gets the complete channel state information. Instead of waiting for getting complete CSI from the UE 305, the base station 301 starts scheduling the UE 305 after receiving the first TTI. In the first TTI, the base station 301 has only received the PCI MSB, but it will choose a random PCI LSB within the subset indicated by RI. The random chosen PCI may not be exactly the same as the original PCI LSB, which will be received in the second TTI. However, the impact due to the PCI error is minimal.

Step 405

The information about the transport blocks, modulation and coding scheme, precoding control index from step 404 is transmitted from the base station 301 to the UE 305 using the HS-SCCH.

Step 406

The UE 305 detects the HS-SCCH.

Step 407

Once the UE 305 has detected the HS-SCCH, the downlink transmission from the base station 301 starts through the data traffic channel using the HS-PDSCH.

Note that although the description above assumes that the four branch MIMO is applied to a single downlink carrier it is straightforward to extend the embodiments to scenarios where a four branch MIMO is used in combination with multi-carrier HSDPA operation.

The method described above will now be described seen from the perspective of the user equipment 305.

Figure 11:
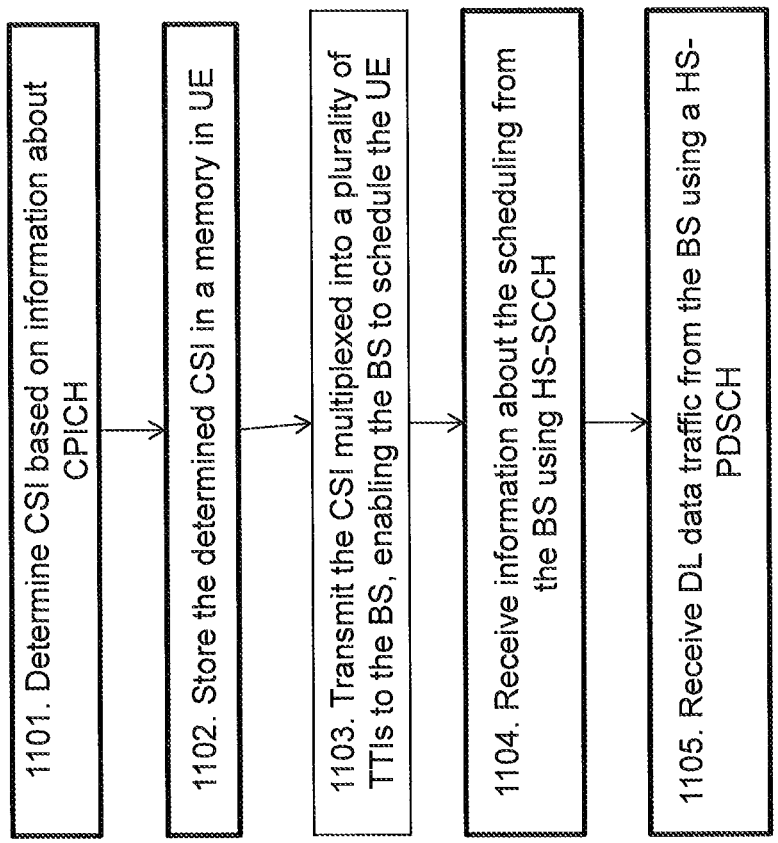
FIG. 11 is a flow chart illustrating embodiments of a method in a UE.

FIG. 11 is a flowchart describing the present method in the user equipment 305 for scheduling the user equipment 305 in a wireless communication system 300. The base station 301 is connected to the user equipment 305 via a radio carrier 302. The radio carrier 302 may be a single downlink carrier or a multi-carrier. The wireless communication system 300 may be an n-way transmit antenna wireless communication system, wherein n is a positive integer larger than one. In some embodiments, the wireless communication system 300 is a four-way transmit antenna wireless communication system. In some embodiments, the communications system 300 is a high speed downlink packet access, HSDPA, system. The method comprises the following steps to be performed by the user equipment 305:

Step 1101

The user equipment 305 determines CSI based on information about a CPICH. The CSI comprises CQI, a RI, a PCI, and a HARQ ACK.

Step 1102

In some embodiments, the UE 305 stores the determined CSI in a memory 1305 comprised in the UE 305.

Step 1103

The UE 305 transmits the CSI multiplexed into a plurality of TTIs to the base station 301, thereby enabling the base station 301 to schedule the UE 305. The CSI is multiplexed into a plurality of TTIs and transmitted to the base station 301 may be the stored CSI. The TTI may be a subframe. In some embodiments, a first CQI corresponding to a first layer and a second CQI corresponding to a second layer is transmitted in different TTIs. In some embodiments, the first CQI corresponding to the first layer is transmitted in a first TTI and the second CQI corresponding to the second layer is transmitted in a second TTI. In some embodiments, the first CQI and the second CQI are each a CQI single stream, CQI-S. The CQI may be transmitted using 5 bits for rank 2-transmissions. In some embodiments, a discontinuous transmission, DTX, codeword is transmitted in a second TTI. In some embodiments, the DTX codeword is transmitted in the second TTI for a Rank-1 Transmission. The CSI may be transmitted to the base station 301 using a high speed-dedicated physical control channel, HS-DPCCH.

Step 1104

In some embodiments, the UE 305 receives information about the scheduling from the base station 301 using the HS-SCCH.

Step 1105

In some embodiments, the UE 305 receives downlink data traffic from the base station 301 using the HS-PDSCH.

Figure 12:
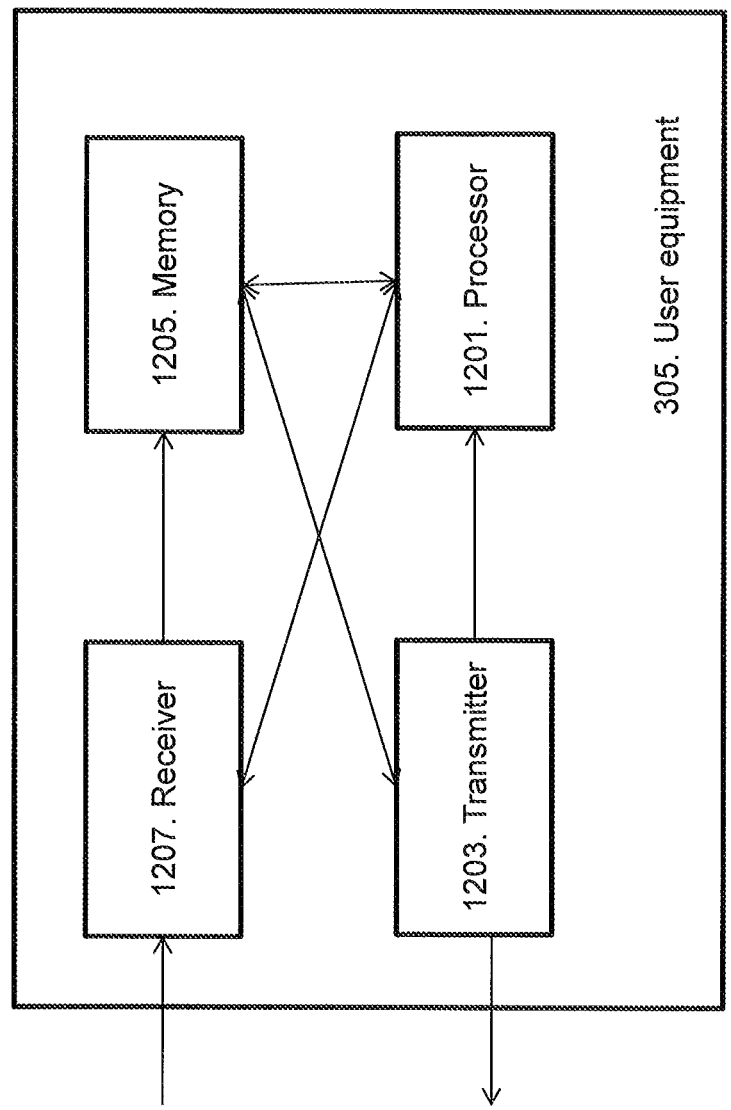
FIG. 12 is a flow chart illustrating embodiments of a UE.

To perform the method steps described herein, the UE 305 may comprises an arrangement of apparatuses as shown in FIG. 12. As mentioned earlier, the UE 305 is connected to the base station 301 via a radio carrier 302. The wireless communication system 300 may be an n-way transmit antenna wireless communication system, wherein n is a positive integer larger than one. The wireless communication system 300 may be a four-way transmit antenna wireless communication system. The radio carrier 302 may be a single downlink carrier or a multi-carrier. The communications system 300 may be a high speed downlink packet access, HSDPA, system.

As shown in FIG. 12, the UE 305 comprises a processor 1201 which is configured to determine CSI based on information about a CPICH. The CSI may comprise a CQI, a RI, a PCI, and a HARQ ACK. In some embodiments, the processor 1301 is further configured to update the determined CSI. The processor 1301 may comprise RF circuitry and baseband processing circuitry. The UE 305 also comprises a transmitter 1203 which is configured to transmit the CSI to the base station 301, enabling the base station 301 to schedule the UE 305. In some embodiments, a first CQI corresponding to a first layer and a second CQI corresponding to a second layer is transmitted in different TTIs. In some embodiments, the first CQI corresponding to the first layer is transmitted in a first TTI and the second CQI corresponding to the second layer is transmitted in a second TTI. In some embodiments, the first CQI and the second CQI are each a CQI single stream, CQI-S. In some embodiments, the CQI is transmitted using 5 bits for rank 2-transmissions. In some embodiments, a discontinuous transmission, DTX, codeword is transmitted in a second TTI. The DTX codeword may be transmitted in the second TTI for a Rank-1 Transmission. In some embodiments, the CSI is multiplexed into a plurality of TTIs and transmitted to the base station 301 is the stored CSI. In some embodiments, the CSI is transmitted to the base station 301 using a high speed-dedicated physical control channel, HS-DPCCH. The TTI may be a subframe.

The UE 305 may further comprise a memory 1205 comprising one or more memory units. The memory 1205 is arranged to be used to store data, received data streams, determined CSI, updated CSI, CPICH, received information about schedulings, received downlink data traffic, threshold values, time periods, configurations, schedulings, and applications to perform the methods herein when being executed in the UE 305. The UE 305 also comprises a receiver 1207 which is configured to receive control information (e.g., control information about the scheduling from the base station 301 using the HS-SCCH), and to receive downlink data traffic from the base station 301 using the HS-PDSCH.

The receiver 1207 and the transmitter 1203 described above may refer to a combination of analog and digital circuits, and/or one or more processors configured with software and/or firmware, e.g. stored in the memory 1205, that when executed by the one or more processors such as the processor 1201 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 13:
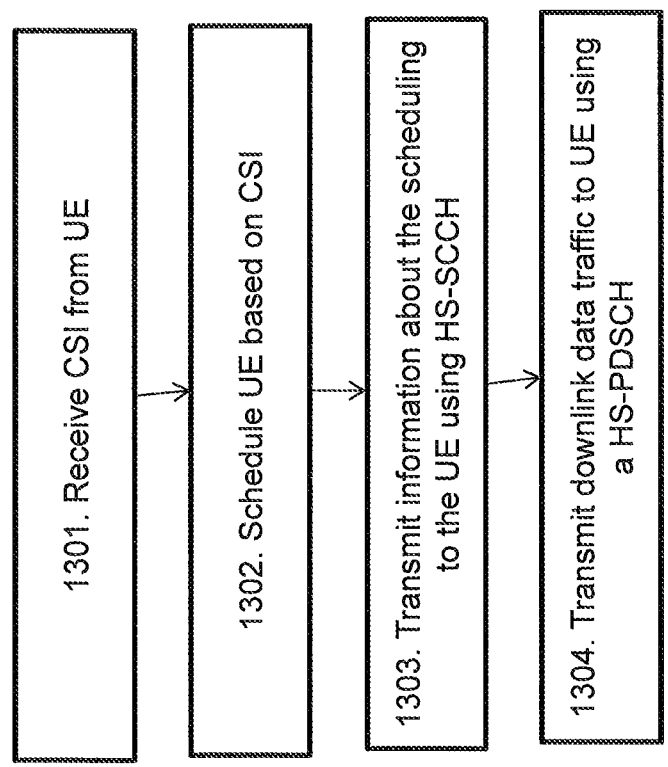
FIG. 13 is a flow chart illustrating embodiments of a method in a base station.

Referring now to FIG. 13, FIG. 13 is a flowchart describing a method, according to some embodiments, performed by station 301 for scheduling UE 305. As shown in FIG. 13, the method comprises the following steps, which steps may be performed in any suitable order:

Step 1301

The base station 301 receives channel state information, CSI, from the UE 305 over a plurality of transmission time intervals, TTI, which CSI comprises CQI, a rank indicator, RI, a precoding channel indicator, PCI, and an hybrid automatic repeat request acknowledgement, HARQ ACK. In some embodiments, a first CQI corresponding to a first layer and a second CQI corresponding to a second layer is received in different TTIs. The first CQI corresponding to the first layer may be received in a first TTI and the second CQI corresponding to the second layer may be received in a second TTI. The first CQI and the second CQI may each be a CQI single stream, CQI-S. In some embodiments, the CQI is received using 5 bits for rank 2-transmissions. In some embodiments, a discontinuous transmission, DTX, codeword is received in a second TTI. The DTX codeword may be received in the second TTI for a Rank-1 Transmission. The CSI may be received from the UE 305 using a high speed-dedicated physical control channel, HS-DPCCH. Each TTI of the plurality of TTIs may be a subframe.

Step 1302

The base station 301 schedules the UE 305 based on the received CSI. The base station 301 may schedule a transport block, a modulation and coding scheme and a precoding control index to the UE 305.

Step 1303

In some embodiments, the base station 301 transmits information about the scheduling to the UE 305 using a high speed shared control channel, HS-SCCH.

Step 1304

In some embodiments, the base station 301 transmits downlink data traffic to the UE 305 using a high speed physical downlink shared channel, HS-PDSCH.

Figure 14:
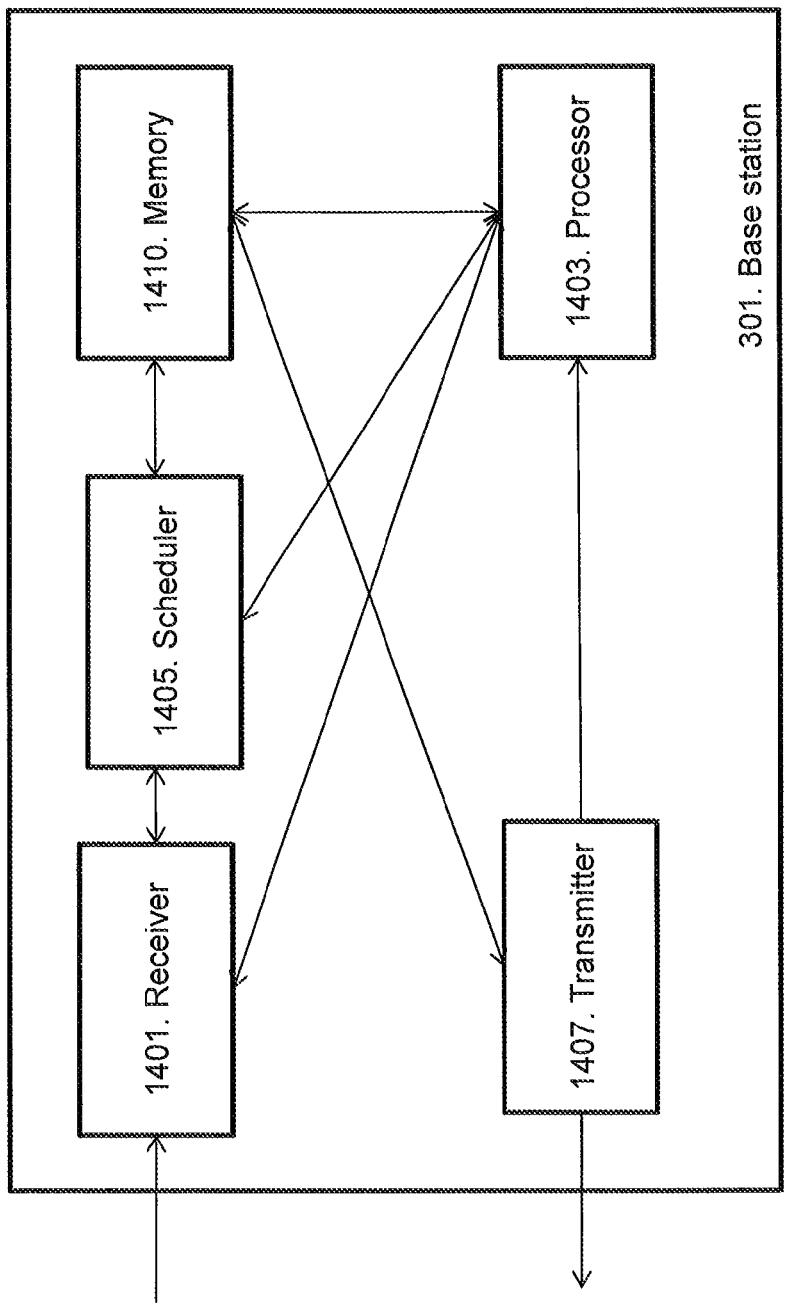
FIG. 14 is a schematic block diagram illustrating embodiments of a base station.

To perform the method steps described herein, the base station 301 may comprises an arrangement of apparatuses as shown in FIG. 14. In the embodiment show, in FIG. 14, the base station 301 comprises a receiver 1401 which is configured to receive channel state information, CSI, from the UE 305 over a plurality of transmission time intervals, TTI, which CSI comprises CQI. The base station 301 comprises a scheduler 1405 configured to schedule the UE 305 based on the received CSI. The scheduler 1405 may be further configured to schedule a transport block, a modulation and coding scheme and a precoding control index to the UE 305. The base station 301 may comprise a transmitter 1407 configured to transmit information about the scheduling to the UE 305 using a high speed shared control channel, HS-SCCH, and to transmit downlink data traffic to the UE 305 using a high speed physical downlink shared channel, HS-PDSCH. The base station 301 may further comprise a memory 1401 comprising one or more memory units. The memory 1401 is arranged to be used to store data, received data streams, determined CSI, updated CSI, CPICH, received information about scheduling's, received downlink data traffic, threshold values, time periods, configurations, scheduling's, and applications to perform the methods herein when being executed in the base station 301.

The receiver 1401, the scheduler 1405 and the transmitter 1407 described above may refer to a combination of analog and digital circuits, and/or one or more processors configured with software and/or firmware, e.g. stored in the memory 1410, that when executed by the one or more processors such as the processor 1403 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The present mechanism for scheduling a UE 305 in a wireless communication system 300 may be implemented through one or more processors, such as a processor 1403 in the base station arrangement depicted in FIG. 14 and a processor 1201 in the UE arrangement depicted in FIG. 12, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the base station 301 and/or UE 305. One such carrier may be in the form of a CD ROM disc. It is however feasible with other data carriers such as a memory stick. The computer program code can furthermore be provided as pure program code on a server and downloaded to the base station 301 and/or UE 305.

II. Channel Status Reporting Embodiments

As discussed herein, in the current scheme of channel status information reporting, there are no constraints on the UE 305 with respect to the number of layers (i.e., transport blocks) the UE 305 may choose to recommend to the base station (e.g., in four branch MIMO the UE 305 is free to choose include in a channel status report an RI having a value of 1, 2, 3 or 4). Since this may lead to sub-optimal scheduling in the base station, this disclosure proposes at least two type of channel status reports: type A and type B. The UE 305 can be configured to sometimes provide type A status reports and sometimes provide type B status reports. For instance, the UE 305 can be configured to respond to messages from the base station that indicate how often the UE 305 should send type A reports and how often type B reports should be reported. These messages may be referred to as "CSR orders" (or "orders" for short). As a particular example, the base station may send an order to the UE 305 instructing the UE 305 to send one type B report for every 10 type A reports that the UE 305 sends. As discussed above, the UE 305 may be configured such that it periodically transmits a channel status report (e.g., every 2 msec it transmits either a type A or type B report).

Type A Reporting:

In some embodiments, when a UE 305 generates and transmits a type A report, the UE 305 is not restricted with respect to the RI value included (explicitly or implicitly) in the report. Thus, a type A channel status report is like a conventional channel status report.

Type B Reporting:

In some embodiments, when a UE 305 generates and transmits a type B report, the UE 305 is restricted with respect to the RI value included (explicitly or implicitly) in the report. In this way, a UE 305 can be prevented from providing to the base station a CQI associated with an RI=4, which can be helpful in those situations where the base station is resource constrained. There are several options for type B reporting.

Option 1:

In a first option, only rank 1 (RI=1) is allowed (i.e., the type B report can only indicate that the number of transport blocks preferred is one). Thus, the UE 305 suggests a rank of 1 regardless of the channel condition. That is, the CQI reported will be a rank 1 CQI.

Option 2:

In a second option only rank 2 (RI=2) is allowed. Thus, the UE 305 suggests a rank of 2 regardless of the channel condition. That is, the CQI reported will be a rank 1 CQI.

Option 3:

In a third option the UE 305 is given a choice of reporting a rank of 1 or a rank of 2. For instance, if the UE 305 determines that the channel condition is lower than some threshold, then the UE 305 will choose rank 1, otherwise it will choose rank 2.

Option 4:

In a fourth option the UE 305 determines a rank based on its channel condition measurement and then reports a rank that is one less than the determined rank. For example, if the channel condition is excellent, the UE 305 may determine a rank of 4, but will report a rank of 3. That is, the UE 305 will report CQI based on a rank that is one less that the rank determined based on the channel condition (e.g., the rank reported in the immediately previous type A report).

Option 5:

In a fifth option, the base station can configure the UE 305 to report a certain particular rank. For example, the base station can send a message to the UE 305 using a downlink shared channel (HS-SCCH) to indicate a desired rank that the UE 305 should indicate in the next type B report. For example, if the base station is severely resource constrained, the base station may send a message to the UE 305 to include a rank 1 CQI in the next channel status report that the UE 305 sends.

Figure 21:
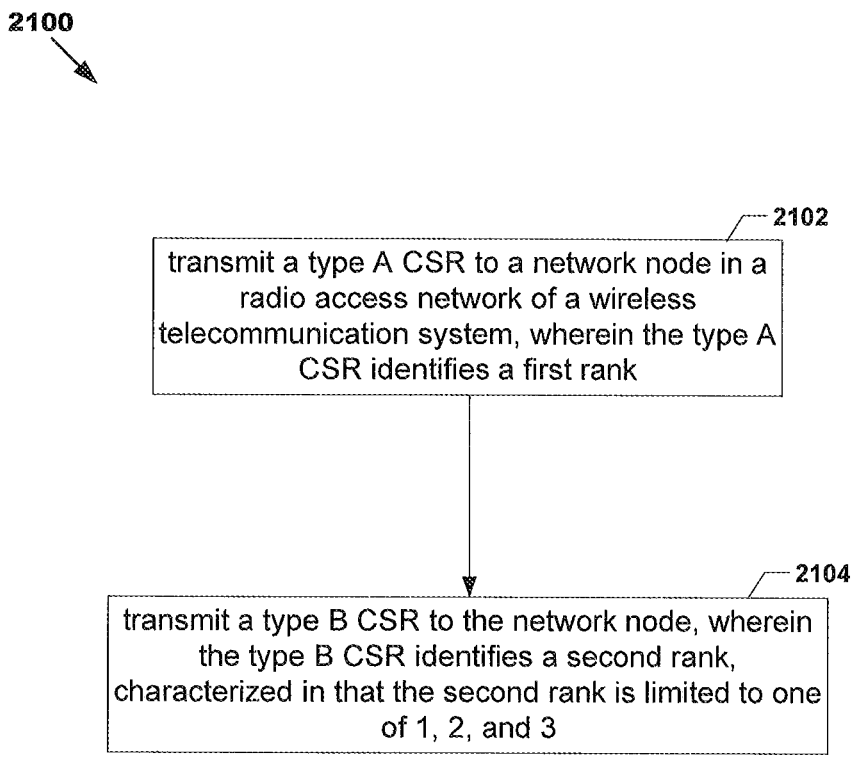

Referring now to FIG. 21, FIG. 21 is a flow chart illustrating a process 2100 performed by the UE 305, which is configured in multiple input multiple output, MIMO, mode with four transmit antennas 399. In step 2102, the UE transmits a type A CSR to network node 301, which is part of a RAN of wireless telecommunication system 300, wherein the type A CSR identifies a first rank. In step 2104, the UE transmits a type B CSR to the network node, wherein the type B CSR identifies a second rank, characterized in that the second rank is limited to one of 1, 2, and 3.

Figure 15:
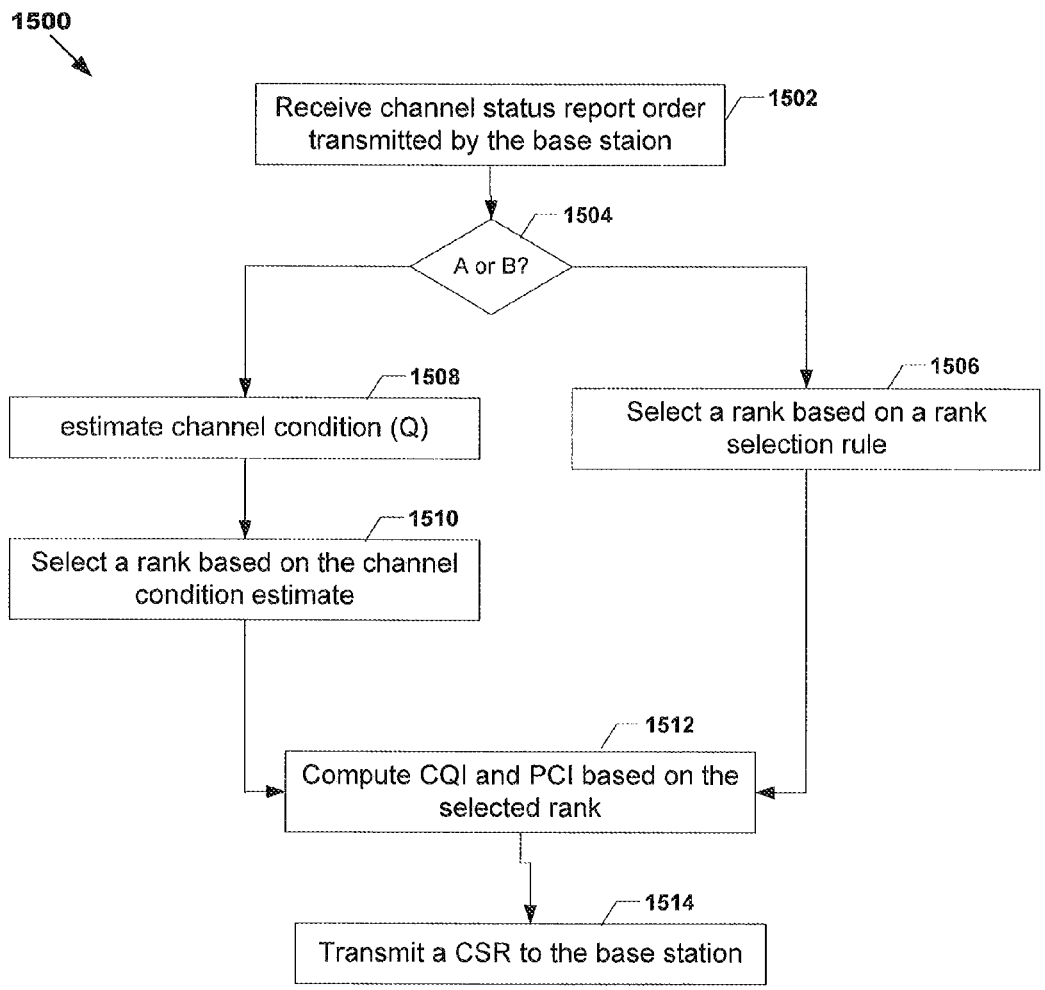
FIGS. 15-18 are flow charts illustrating embodiments of a method in a UE.

Referring now to FIG. 15, FIG. 15 is a flow chart illustrating a process 1500 performed by the UE 305 according to some embodiments. Process 1500 may begin in step 1502, where the UE 305 receives a CSR order transmitted by the base station, which order indicates how often the UE 305 should transmit type B CSRs.

In step 1504, the UE 305 determines whether it should transmit a type A CSR or a type B CSR. If type A, the process proceeds to step 1508, otherwise to 1506.

In step 1506, the UE 305 selects a rank based on a predefined rule. For example, the rule may be a simple rule where the UE 305 simply selects a pre-defined rank (e.g., rank 1 or rank 2), or it may be a more complex rule that takes the measured channel condition into account. After step 1506, process proceeds to step 1512.

In step 1508, from the CPICH in step 101, the UE 305 estimates the channel conditions. In step 1510, the UE 305 selects a rank using the estimated channel conditions.

In step 1512, the UE 305 determines a CQI and a PCI based on the selected rank.

In step 1514, the UE 305 transmits to the base station a CSR containing (explicitly or implicitly) the determined CSI (i.e., CQI, PCI, and rank (RI)).

Figure 16:
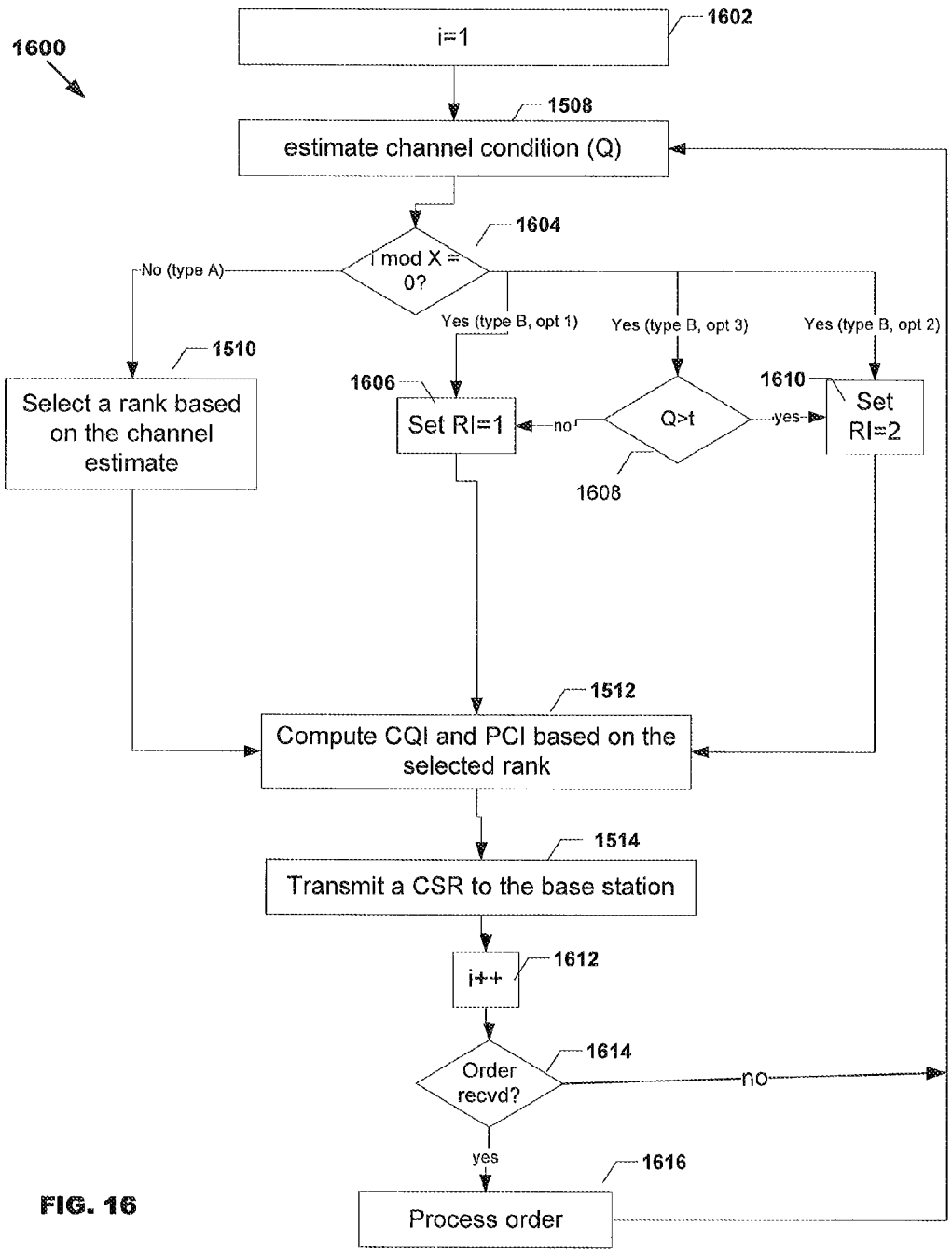

FIG. 16 is a flow chart illustrating a process 1600 for implementing options 1, 2 or 3, according to some embodiments. Process 1600 is performed by the UE. In step 1602, a counter (i) is initialized (e.g., set equal to 1). Next, step 1508, which is described above, may be performed. In step 1604, the UE 305 determines whether i mod x=0, where x is a value signalled to the UE 305 by the base station. For example, x may be included in an order received from the base station. If i mod x is not equal to 0, then step 1510 may be performed. Otherwise, one of steps 1606, 1608, and 1610 may be performed, after which steps 1512 and 1514 may be performed. In step 1606, the UE 305 selects a rank of 1. In step 1608, the UE 305 selects a rank of 2. In step 1608, the UE 305 determines whether Q is greater than a threshold t, where Q represents the estimated channel condition. Depending on Q, the UE 305 may select rank 1 or rank 2. In step 1612, the counter is incremented. In step 1614, UE 305 determines whether an order has been received from the base station. If so, the order is processed (step 1616). The process then repeats. As illustrated, in this embodiments, UE 305 transmits one type B report for every x−1 type A reports.

Figure 17:
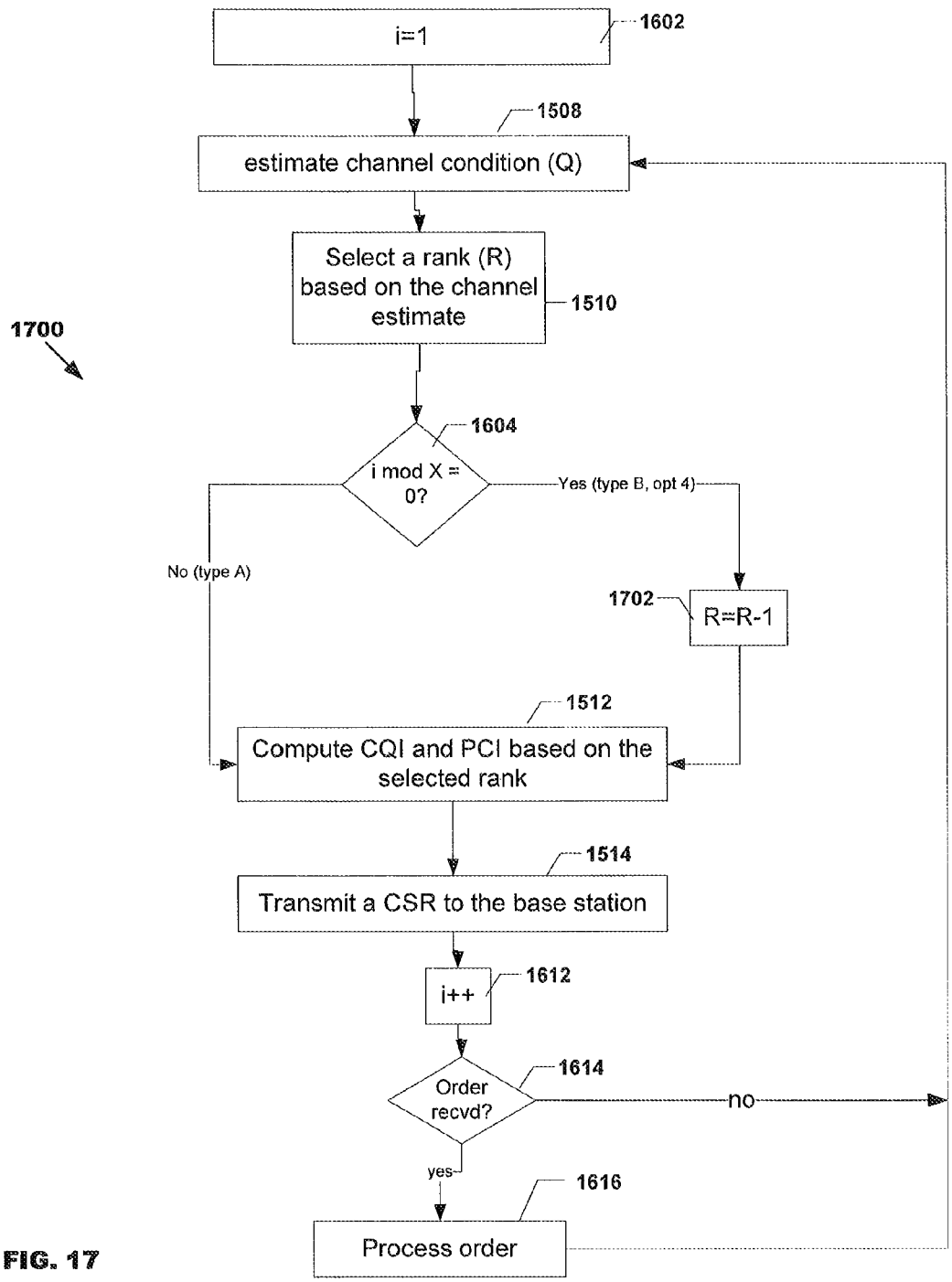

FIG. 17 is a flow chart illustrating a process 1700 for implementing option 4, according to some embodiments. Process 1700 is performed by the UE. As illustrated process 1700 is very similar to process 1600, the difference being that steps 1606-1610 are replaced with step 1702 and the ordering of steps is different. In step 1702, which is performed if UE 305 determines that a type B report should be set, the UE 305 reduces by one the rank (R) selected based on the channel estimate. Thus, in this embodiment, the selected rank is R−1 for type B reports, but for type A reports the selected rank is R.

Figure 18:
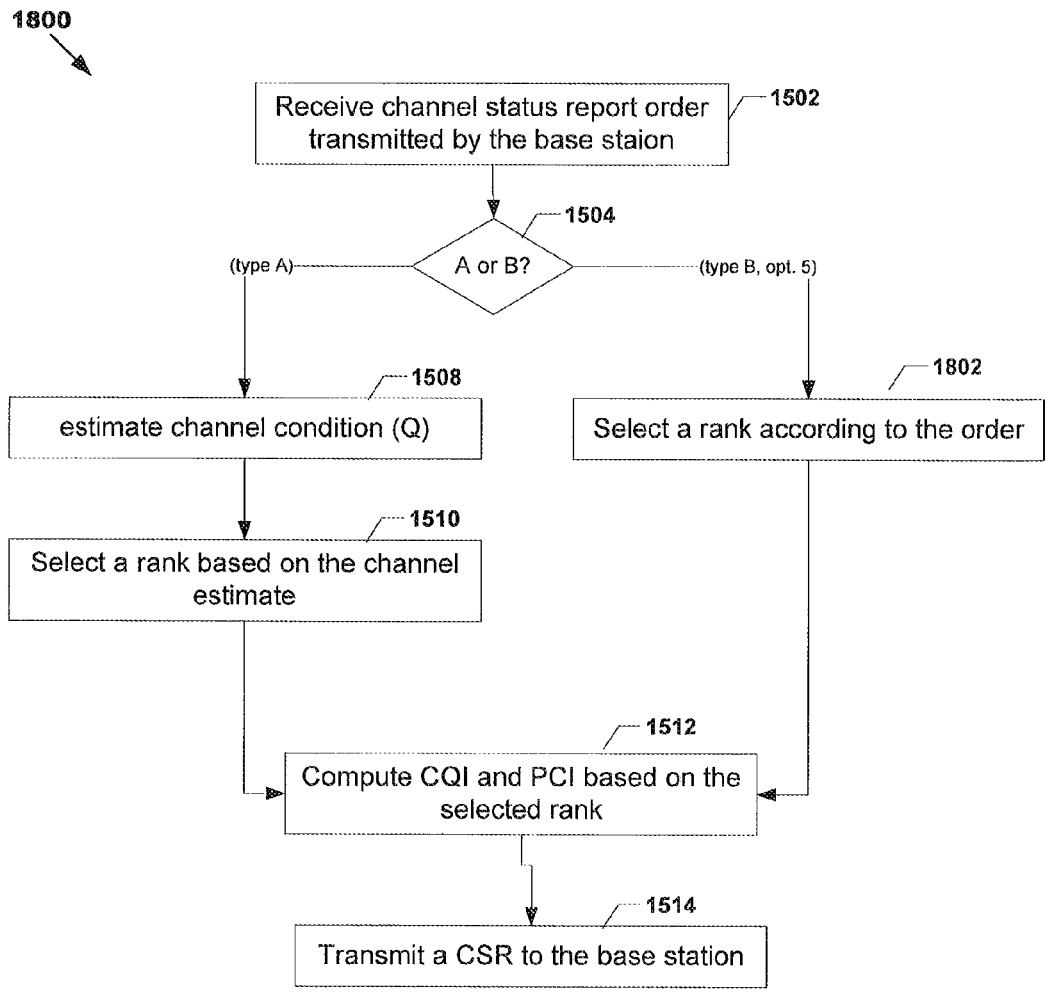

FIG. 18 is a flow chart illustrating a process 1800 for implementing option 5 according to some embodiments. This embodiment is like process 1500 where the rank selection rule is a rule that states that the UE 305 should select a rank based on an order received from the base station. For example, the base station may transmit an order indicating a rank of X, and in step 1808, in some embodiments, the UE 305 will select a rank equal to X (or a rank less than or equal to X) because that is what the base station ordered. That is, in some embodiments, the UE 305 is configured such that if the order specifies a rank value, the UE 305 will select a rank value that is less than or equal to the specified rank value. In this way, if the base station is resource constrained, the base station can order the UE 305 to select a lower rank that the UE 305 might have selected otherwise had the UE 305 selected the rank merely based on the channel estimate.

Figure 19:
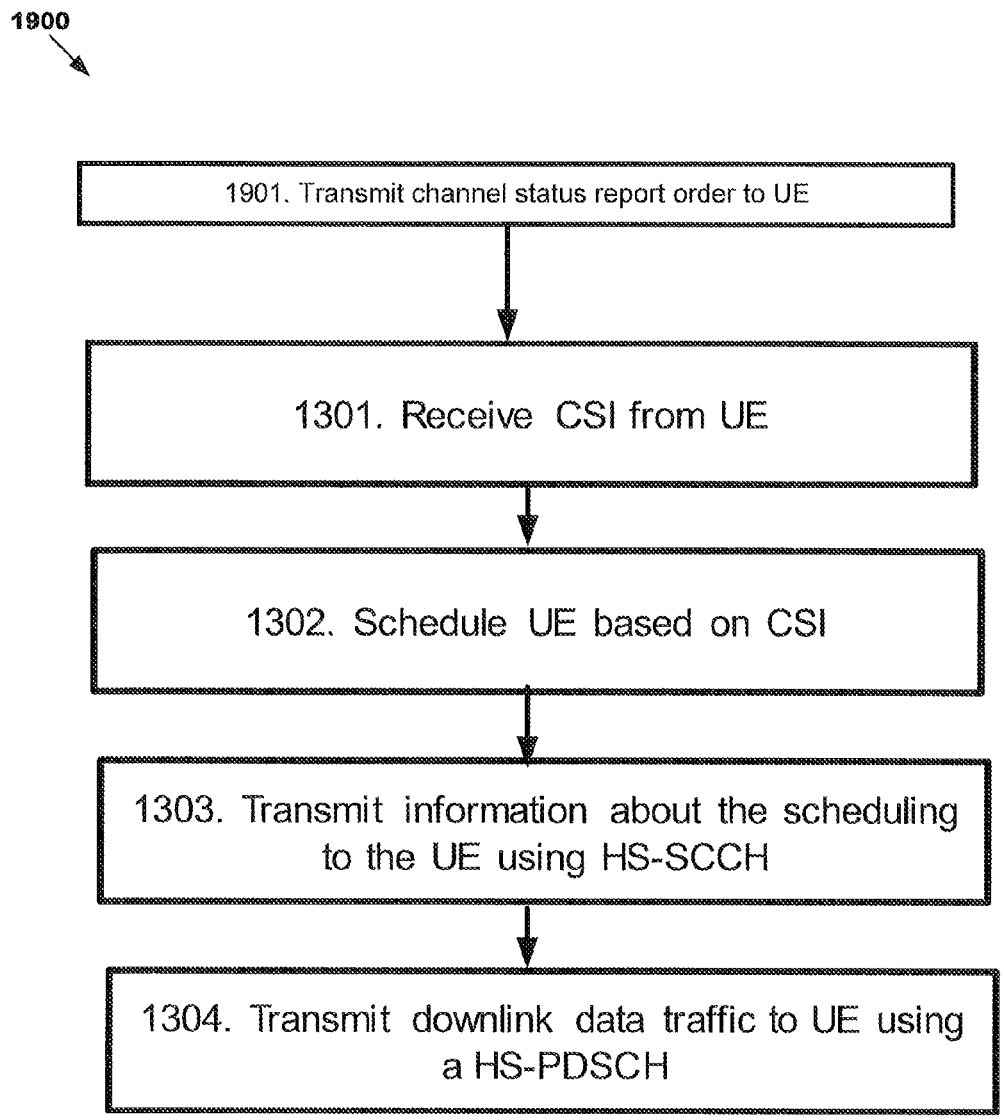
FIGS. 19-20 are flow charts illustrating embodiments of a method in a base station.

FIG. 19 is a flow chart illustrating a process 1900 performed by the base station according to some embodiment. Process 1900 is like process 1300 except that process 1300 includes step 1902. In step 1902 the base station sends to the UE 305 a channel status report order. In some embodiments, this order indicates how often the UE 305 should transmit type B reports and/or specifies a rank value as discussed above with respect to process 1800.

Figure 20:
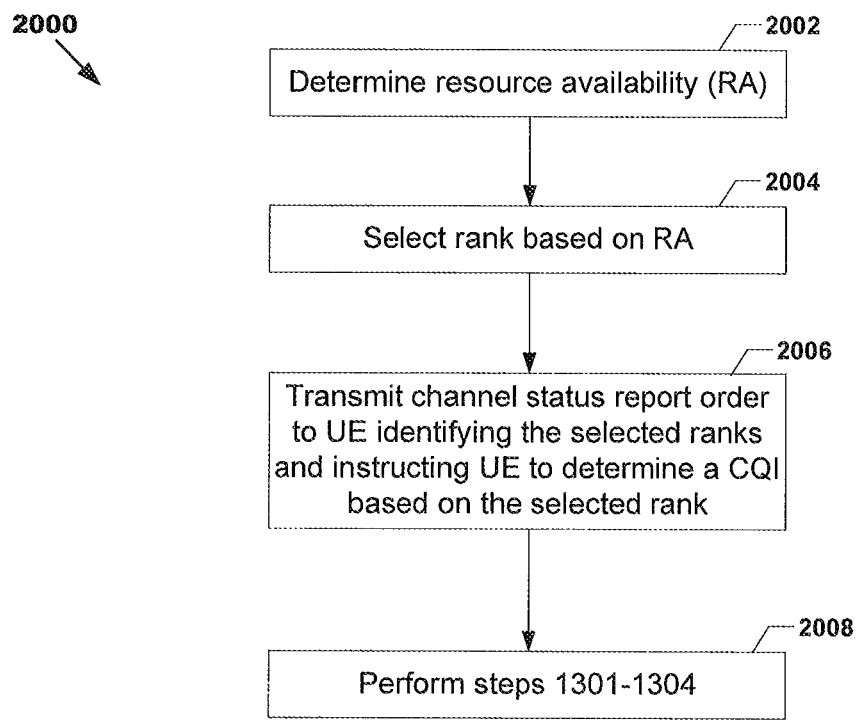

FIG. 20 is a flow chart illustrating a process 2000 also performed by the base station according to some embodiments. In step 2002, the base station determines its resource availability (RA). For example, the base station may determine how loaded it is with traffic. In step 2004, the base station selects a rank based on the determined RA. In step 2006, the base station transmits a channel status report order to a UE 305 identifying the selected rank and instructing (at least implicitly) the UE 305 to select a CQI based on the selected rank. Next (2008), base station may perform steps 1301-1304 described above.

The channel status reporting embodiments described above in section II can work with any structures for reporting CSI, including, but not limited to, the various structures described herein in section I.

The method described above may be implemented through one or more processors, such as a processor 1403 in the base station arrangement depicted in FIG. 14 and a processor 1201 in the UE 305 arrangement depicted in FIG. 12, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the base station 301 and/or UE 305. One such carrier may be in the form of a CD ROM disc. It is however feasible with other data carriers such as a memory stick. The computer program code can furthermore be provided as pure program code on a server and downloaded to the base station 301 and/or UE 305.

The term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

It should also be emphasised that the steps of the methods may, without departing from the embodiments herein, be performed in another order than the order in which they appear.

The invention claimed is:

1. A method performed by a user equipment (UE) in a wireless telecommunication system, the UE being configured in multiple input multiple output (MIMO) mode with four transmit antennas, the method comprising:

transmitting a type A channel status report, CSR, to a network node in a radio access network of the wireless telecommunication system, wherein the type A CSR identifies a first rank selected from a first set of ranks; and transmitting a type B CSR to the network node, wherein the type B CSR identifies a second rank, wherein the second rank is selected from a second set of ranks, said second set of ranks having fewer ranks than the first set of ranks, wherein the method further comprises:

A) prior to transmitting the type A CSR:
      Ai) selecting a first rank from said first set of ranks based on a first estimated channel condition;

Aii) calculating a first channel quality indicator, CQI, value based on, at least in part, the selected first rank; and Aiii) including the first CQI value in the type A CSR; and B) prior to transmitting the type B CSR, determining whether a predetermined number of type A CSRs have been transmitted since the last type B CSR was transmitted and, as a result of determining that the predetermined number of type A CSRs have been transmitted since the last type B CSR was transmitted, performing the following steps:

Bi) selecting a second rank from said second set of ranks based on a second estimated channel condition;

Bii) calculating a second CQI value based on, at least in part the selected second rank; and Biii) including the second CQI value in the type B CSR.

2. The method of claim 1, wherein the second rank is limited to one of 1 and 2.

3. The method of claim 1, wherein the second rank indicates that the number of preferred transport blocks is 1.

4. The method of claim 1, further comprising:
receiving from the network node a CSR order specifying a number of type A CSRs that should be transmitted for each X number of type B CSRs that are transmitted, wherein X is an integer greater than zero.

5. The method of claim 1, wherein
the step of selecting the second rank from said second set of ranks based on the second estimated channel condition comprises:
determining whether a value (Q) representing the second estimated channel condition is greater than a threshold (t); and
performing one of the following steps after making the determination:
i) selecting a first rank value as a result of determining that Q is greater than t; and
ii) selecting a second rank value as a result of determining that Q is less than t, wherein the second rank value is less than the first rank value.

6. A user equipment (UE) in a wireless telecommunication system, the UE being configured in multiple input multiple output (MIMO) mode with four transmit antennas, the UE being configured to:
transmit a type A channel status report, CSR, to a network node (in a radio access network of the wireless telecommunication system, wherein the type A CSR identifies a first rank selected from a first set of ranks; and
transmit a type B CSR to the network node, wherein the type B CSR identifies a second rank, wherein the second rank is selected from a second set of ranks, said second set of ranks having fewer ranks than the first set of ranks, wherein
the UE is further configured to:
A) prior to transmitting the type A CSR:
i) select a first rank from said first set of ranks based on a first estimated channel condition;
ii) calculate a first channel quality indicator (CQI) value based on, at least in part, the selected first rank; and
iii) include the first CQI value in the type A CSR; and B) prior to transmitting the type B CSR, determine whether a predetermined number of type A CSRs have been transmitted since the last type B CSR was transmitted and, as a result of determining that the predetermined number of type A CSRs have been transmitted since the last type B CSR was transmitted:
i) select a second rank from said second set of ranks based on a second estimated channel condition;
ii) calculate a second CQI value based on, at least in part, the selected second rank; and
iii) include the second CQI value in the type B CSR.

7. The UE of claim 6, wherein the second rank is limited to one of 1 and 2.

8. The UE of claim 6, wherein the second rank indicates that the number of preferred transport blocks is 1.

9. The UE of claim 6, wherein the UE comprises a receiver for receiving from the network node a CSR order specifying a number of type A CSRs that should be transmitted for each X number of type B CSRs that are transmitted, wherein X is an integer greater than zero.

10. A computer program product comprising a non-transitory computer readable medium storing computer instructions which, when executed by a processor of a user equipment (UE) configured in multiple input multiple output (MIMO) mode with four transmit antennas, configures the UE to:
transmit a type A channel status report, CSR, to a network node in a radio access network of the wireless telecommunication system, wherein the type A CSR identifies a first rank selected from first set of ranks; and
transmit a type B CSR to the network node, wherein the type B CSR identifies a second rank, wherein the second rank is selected from a second set of ranks, said second set of ranks having fewer ranks than the first set of ranks, wherein
the computer instructions further includes instructions for configuring the UE to:
A) prior to transmitting the type A CSR:
i) select a first rank from said first set of ranks based on a first estimated channel condition;
ii) calculate a first channel quality indicator (CQI) value based on, at least in part, the selected first rank; and
iii) include the first CQI value in the type A CSR; and
B) prior to transmitting the type B CSR, determine whether a predetermined number of type A CSRs have been transmitted since the last type B CSR was transmitted and, as a result of determining that the predetermined number of type A CSRs have been transmitted since the last type B CSR was transmitted:
i) select a second rank from said second set of ranks based on a second estimated channel condition;
ii) calculate a second CQI value based on, at least in part, the selected second rank; and
iii) include the second CQI value in the type B CSR.

* * * * *